(12) United States Patent
Kakeya et al.

(10) Patent No.: US 11,884,054 B2
(45) Date of Patent: Jan. 30, 2024

(54) ANTI-REFLECTION FILM LAMINATE, ANTI-REFLECTION FILM, AND METHOD FOR MANUFACTURING ANTI-REFLECTION FILM LAMINATE

(71) Applicant: MITSUBISHI GAS CHEMICAL COMPANY, INC., Tokyo (JP)

(72) Inventors: Fumiaki Kakeya, Tokyo (JP); Yasutaka Fukunaga, Tokyo (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 221 days.

(21) Appl. No.: 17/439,090

(22) PCT Filed: Mar. 18, 2020

(86) PCT No.: PCT/JP2020/011920
§ 371 (c)(1),
(2) Date: Sep. 14, 2021

(87) PCT Pub. No.: WO2020/189707
PCT Pub. Date: Sep. 24, 2020

(65) Prior Publication Data
US 2022/0152979 A1    May 19, 2022

(30) Foreign Application Priority Data
Mar. 18, 2019  (JP) .................. 2019-050196

(51) Int. Cl.
*B32B 7/023* (2019.01)
*B29C 51/26* (2006.01)
(Continued)

(52) U.S. Cl.
CPC ............ *B32B 7/023* (2019.01); *B29C 51/266* (2013.01); *B32B 7/06* (2013.01); *B32B 7/12* (2013.01);
(Continued)

(58) Field of Classification Search
None
See application file for complete search history.

(56) References Cited

U.S. PATENT DOCUMENTS

| 2004/0151895 | A1  | 8/2004  | Itoh et al. |
| 2008/0026182 | A1* | 1/2008  | Abe .................. G02B 1/115 428/141 |
| 2016/0301032 | A1* | 10/2016 | Wang ................. H10K 85/151 |

FOREIGN PATENT DOCUMENTS

| EP | 3 505 979 A1  | 7/2019 |
| JP | 2002-145952 A | 5/2002 |

(Continued)

OTHER PUBLICATIONS

Machine translation of JP 2007-188045 A (Year: 2007).*

(Continued)

*Primary Examiner* — Ramsey Zacharia
(74) *Attorney, Agent, or Firm* — GREENBLUM & BERNSTEIN, P.L.C.

(57) ABSTRACT

An objective of the present invention is to provide an anti-reflection film laminate which is for manufacturing an anti-reflection film having low surface reflectance and good anti-reflection properties, as well as excellent thermoformability and scratch resistance. The aforementioned problem is resolved by the following anti-reflection film laminate. This anti-reflection film laminate comprises: a first laminate having a base film that has a release surface, and an optical interference layer laminated on the release surface; and a second laminate having a substrate layer that contains a thermoplastic resin, and an uncured hardcoat layer that is laminated on one surface of the substrate layer and comprises a curable hardcoat composition. The first and second laminate bodies are pressure bonded such that the optical (Continued)

interference layer of the first laminate and the uncured hardcoat layer of the second laminate are in contact with each other.

27 Claims, 5 Drawing Sheets

(51) Int. Cl.
    *B32B 7/06*     (2019.01)
    *B32B 7/12*     (2006.01)
    *B32B 27/30*     (2006.01)
    *B32B 37/10*     (2006.01)
    *B32B 37/12*     (2006.01)
    *G02B 1/111*     (2015.01)
    *G02B 1/14*     (2015.01)

(52) U.S. Cl.
CPC ............ *B32B 27/308* (2013.01); *B32B 37/10* (2013.01); *B32B 37/12* (2013.01); *G02B 1/111* (2013.01); *G02B 1/14* (2015.01); *B32B 2307/412* (2013.01); *B32B 2307/418* (2013.01); *B32B 2307/732* (2013.01); *B32B 2307/748* (2013.01); *B32B 2551/00* (2013.01)

(56) References Cited

FOREIGN PATENT DOCUMENTS

| | | |
|---|---|---|
| JP | 2004-212619 A | 7/2004 |
| JP | 2007-188045 A | 7/2007 |
| JP | 2011-162770 A | 8/2011 |
| JP | 2014-41244 A | 3/2014 |
| JP | 2015-104883 A | 6/2015 |
| JP | 2002-258760 | 9/2022 |
| WO | 03/020509 A1 | 3/2003 |
| WO | 2018/084179 A1 | 5/2018 |

OTHER PUBLICATIONS

Extended European Search Report issued in European Patent Application No. 20773522.6 dated Nov. 16, 2022.
International Search Report issued in International Patent Application No. PCT/JP2020/011920, dated Jun. 23, 2020, along with English translation thereof.
Written Opinion of the International Searching Authority issued in International Patent Application No. PCT/JP2020/011920, dated Jun. 23, 2020, along with English translation thereof.

* cited by examiner

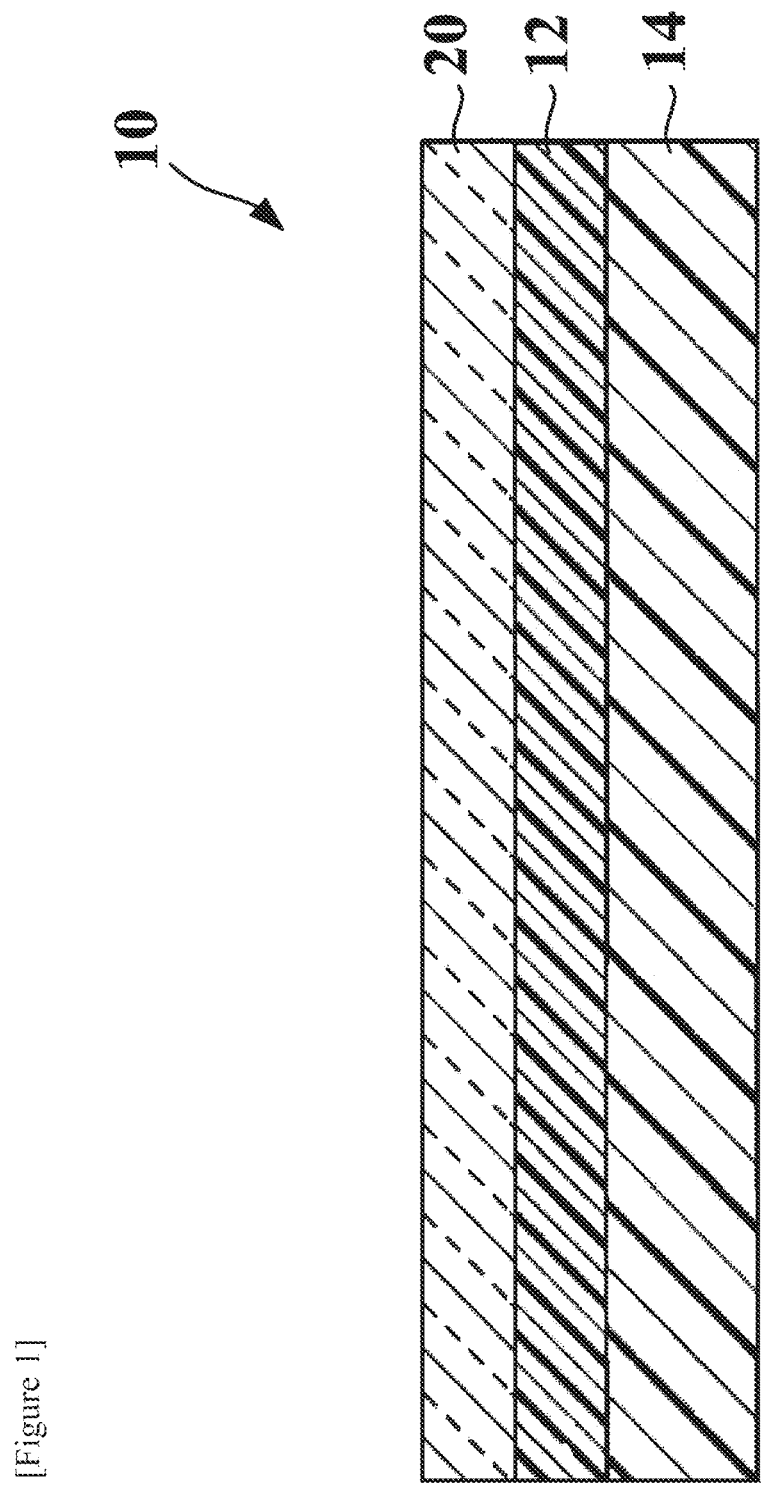
[Figure 1]

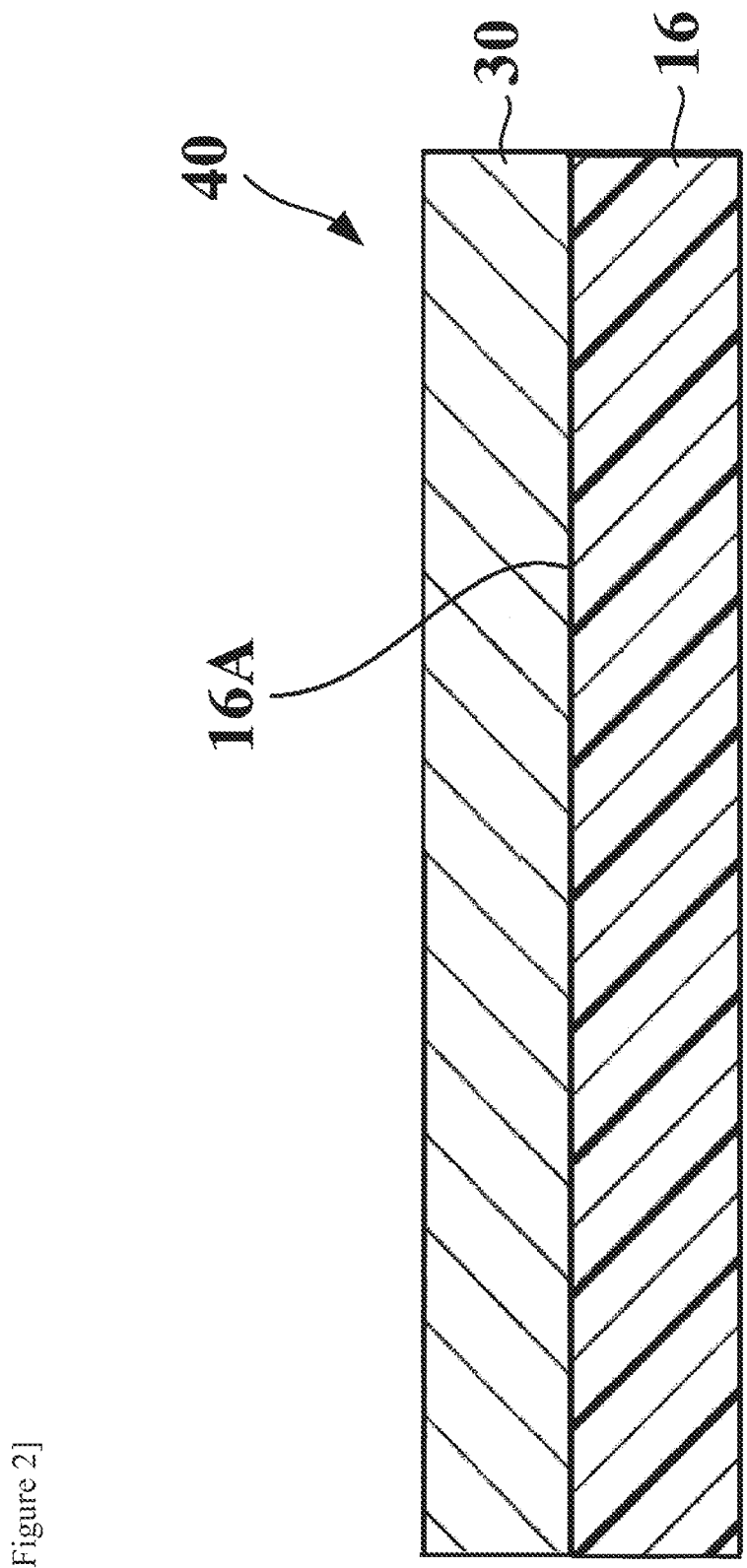
[Figure 2]

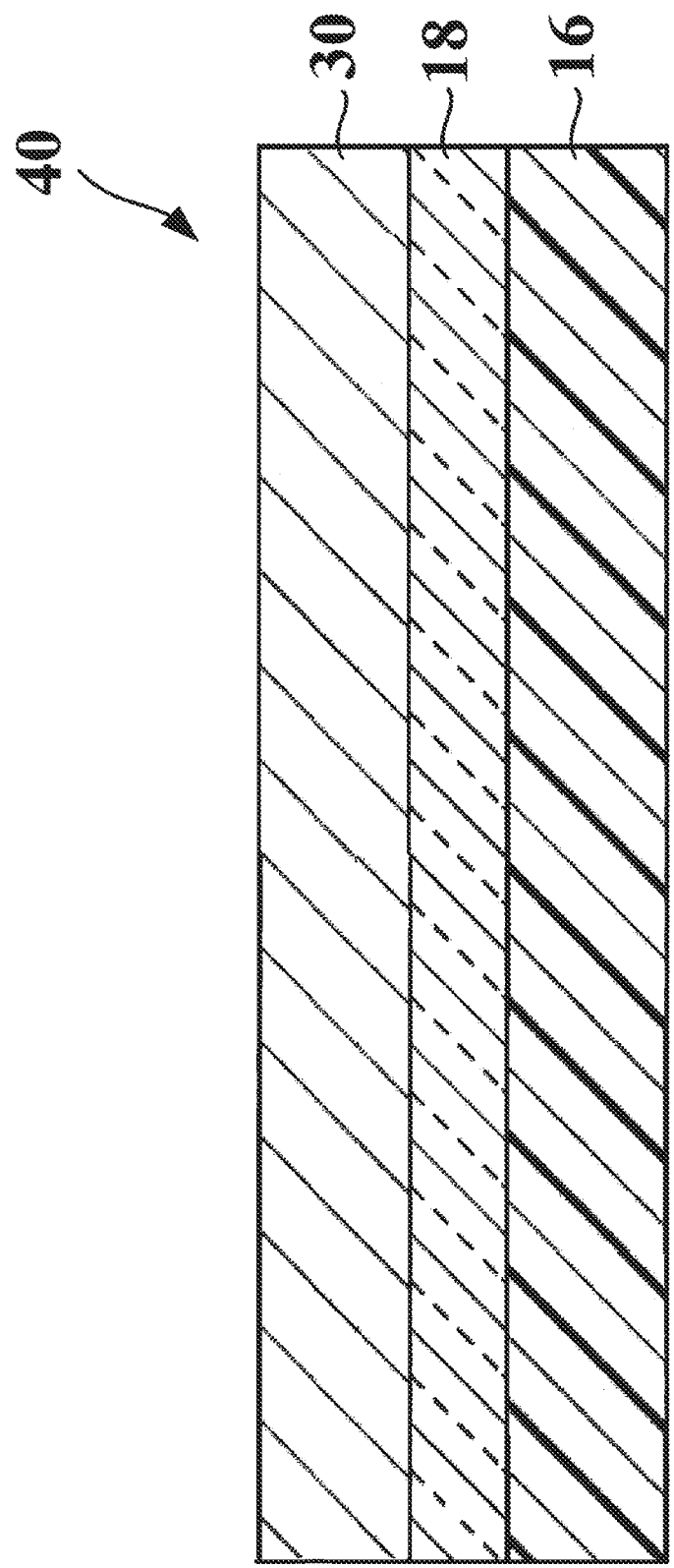
[Figure 3]

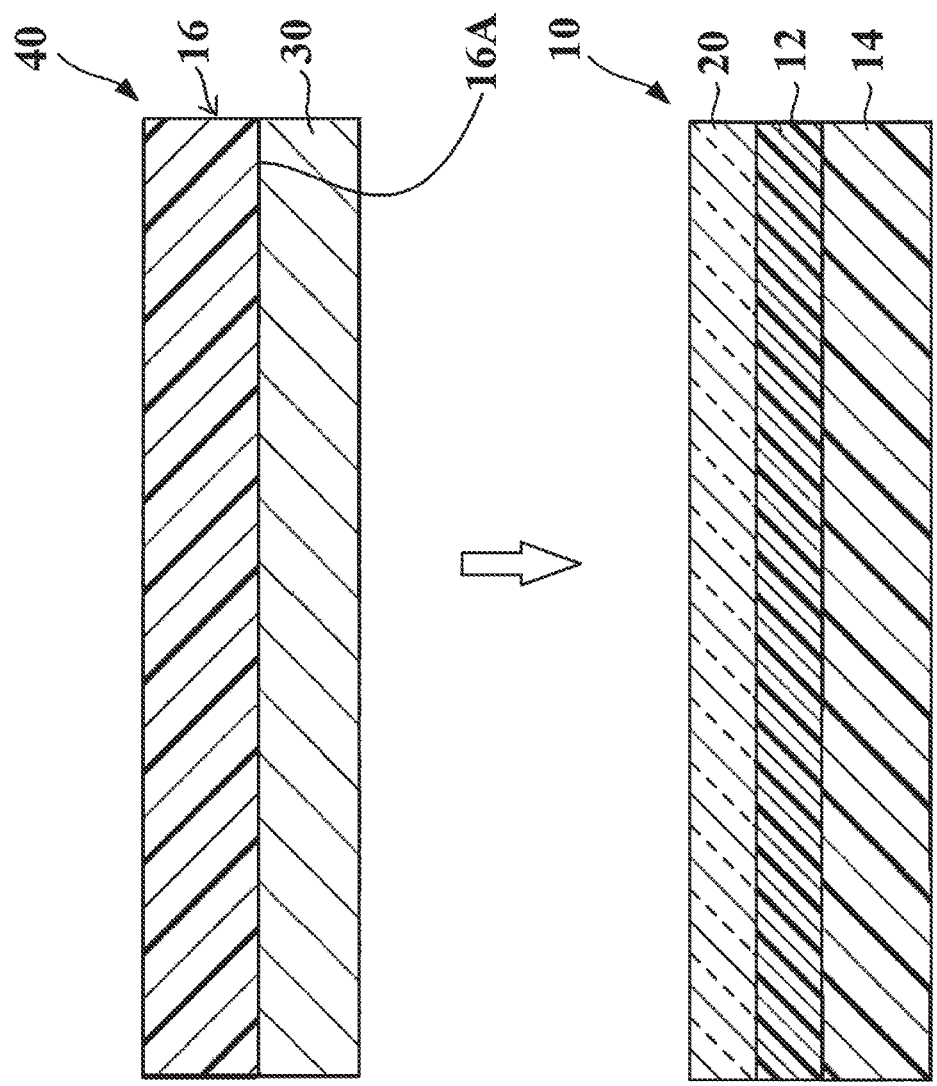
[Figure 4]

[Figure 5]
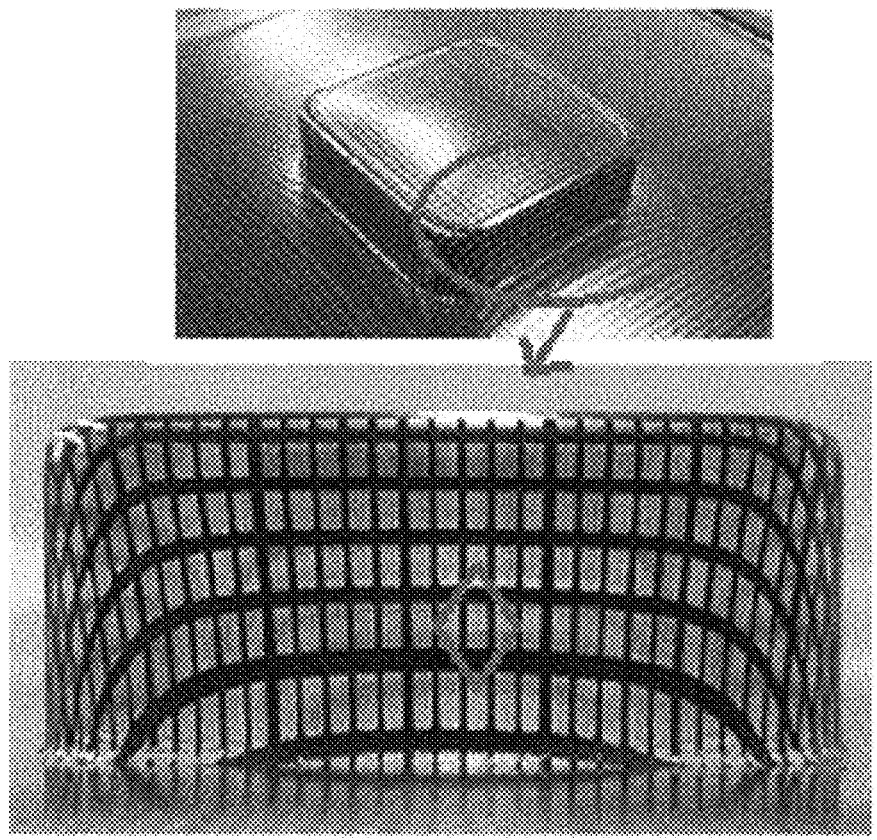

ANTI-REFLECTION FILM LAMINATE, ANTI-REFLECTION FILM, AND METHOD FOR MANUFACTURING ANTI-REFLECTION FILM LAMINATE

TECHNICAL FIELD

The present invention relates to an anti-reflection film laminate suitable for fabricating an anti-reflection film, more particularly, to an anti-reflection film laminate having an optical interference layer such as a low-refractive-index layer laminated on an uncured hard coat layer such that they are in contact with each other, and the like.

BACKGROUND ART

Laminated films with a low surface reflectance which can be used as anti-reflection films are conventionally known (see Patent document 1). Laminated films with a low surface reflectance are used, for example, for applications including a computer screen, a television screen, a plasma display panel, a surface of a polarizing plate used for a liquid crystal display, sunglass lenses, prescription eyeglass lenses, a viewfinder lens used in a camera, various types of meter covers, glass of automobiles, glass of trains, a display panel for a vehicle and a housing for electronic equipment.

PRIOR ART DOCUMENTS

Patent Documents

Patent document 1: Japanese Unexamined Patent Application Publication No. 2014-41244

SUMMARY OF THE INVENTION

Problems to be Solved by the Invention

Thermoformability of laminated films that are conventionally used as anti-reflection films for the aforementioned applications are often insufficient, and they do not necessarily have satisfactory scratch resistance.

Thus, the objective of the present invention is to provide an anti-reflection film laminate that can be used to fabricate an anti-reflection film having excellent thermoformability and excellent scratch resistance along with a low surface reflectance and a good anti-reflection property, and to provide an anti-reflection film and the like.

Means for Solving the Problems

In order to solve the above-described problem, the present inventors have gone through extensive research, and as a result of which found that an anti-reflection film laminate having an optical interference layer, for example, a low-refractive-index layer, laminated on an uncured hard coat layer such that they are in contact with each other is useful for fabricating an anti-reflection film having favorable thermoformability and scratch resistance along with an excellent anti-reflection property, thereby accomplishing the present invention.

Thus, the present invention comprises the followings.

(1) An anti-reflection film laminate, comprising:
a base film having a release surface;
an optical interference layer laminated on the release surface;
an uncured hard coat layer having a curable hard coat composition and laminated on the optical interference layer on the other side from the base film; and
a substrate layer having a thermoplastic resin and laminated on the uncured hard coat layer on the other side from the optical interference layer.

(2) The anti-reflection film laminate according to (1) above, wherein the optical interference layer and the uncured hard coat layer are bonded under pressure such that they are in contact with each other.

(3) The anti-reflection film laminate according to (1) above, further comprising an adhesive agent layer interposed between the optical interference layer and the uncured hard coat layer.

(4) The anti-reflection film laminate according to (3) above, wherein the uncured hard coat layer comprises a curable tack-free hard coat composition.

(5) The anti-reflection film laminate according to any one of (1) to (4) above, wherein the refractive index of the substrate layer is 1.49-1.65, and difference between the refractive index of the substrate layer and the refractive index of the uncured hard coat layer is 0.04 or smaller.

(6) The anti-reflection film laminate according to any one of (1) to (5) above, wherein the optical interference layer comprises a low-refractive-index layer having a refractive index lower than that of the substrate layer or a high-refractive-index layer having a refractive index higher than that of the substrate layer.

(7) The anti-reflection film laminate according to (6) above, wherein the refractive index of the substrate layer is 1.49-1.65 and the refractive index of the low-refractive-index layer is 1.31-1.41.

(8) The anti-reflection film laminate according to either one of (6) and (7) above, wherein the refractive index of the substrate layer is 1.49-1.65 and the refractive index of the high-refractive-index layer is 1.68-1.75.

(9) The anti-reflection film laminate according to any one of (6) to (8) above, wherein the optical interference layer comprises the low-refractive-index layer and the high-refractive-index layer, where the high-refractive-index layer is interposed between the substrate layer and the low-refractive-index layer.

(10) The anti-reflection film laminate according to any one of (6) to (8) above, wherein the optical interference layer has only one low-refractive-index layer, or a laminate of one high-refractive-index layer and one low-refractive-index layer.

(11) The anti-reflection film laminate according to any one of (1) to (11) above, wherein the thickness of the substrate layer is 50-500 μm, and the thickness of the uncured hard coat layer is 1-10 μm.

(12) The anti-reflection film laminate according to any one of (3) to (11) above, wherein the thickness of the adhesive agent layer is 1-10 μm.

(13) The anti-reflection film laminate according to any one of (6) to (12) above, wherein the thickness of the low-refractive-index layer is 10-200 nm.

(14) The anti-reflection film laminate according to any one of (6) to (13) above, wherein the thickness of the high-refractive-index layer is 10-300 nm.

(15) The anti-reflection film laminate according to any one of (1) to (14) above, wherein the optical interference layer comprises a polymer of a resin material containing a urethane acrylate and a (meth)acrylate.

(16) The anti-reflection film laminate according to (15) above, wherein the resin material contains a fluorine-containing urethane acrylate.

(17) The anti-reflection film laminate according to any one of (1) to (16) above, wherein the hard coat composition comprises at least either one of an acrylate monomer and an acrylate oligomer.

(18) The anti-reflection film laminate according to (17) above, wherein the hard coat composition comprises a urethane acrylate oligomer.

(19) The anti-reflection film laminate according to any one of (3) to (18) above, wherein the adhesive agent layer comprises an oligomer and/or a polymer having a urethane bond, wherein the oligomer and/or polymer having a urethane bond is a reaction product of an oligomer and/or a polymer of an acrylate compound having at least one hydroxy group and an isocyanate compound having at least one isocyanate group that forms an urethane bond with the hydroxy group.

(20) The anti-reflection film laminate according to (19) above, wherein the acrylate compound is an alkyl acrylate compound with 30 or less carbon atoms, and the isocyanate compound is an isocyanate compound having a methacryl group with 20 or less carbon atoms.

(21) The anti-reflection film laminate according to either one of (19) and (20) above, wherein the adhesive agent layer comprises an oligomer and/or a polymer having a urethane bond represented by Formula (1) below:

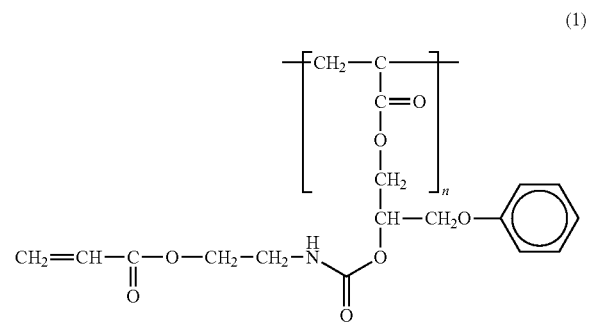

(1)

(in Formula (1), n is an integer of 1-20.)

(22) The anti-reflection film laminate according to any one of (1) to (21) above, wherein the optical interference layer is UV curable.

(23) The anti-reflection film laminate according to any one of (1) to (22) above, wherein provided that: the anti-reflection film laminate is cut into a test piece of 210 mm×297 mm×0.3 mm (thickness); the substrate layer of the test piece is preheated at 190° C. for 40 seconds; the test piece is placed in a mold including a right angle-shaped projection having a deep drawing height of 13 mm and a length and a width of 30 mm each such that the substrate layer makes contact with the mold; and the test piece of the laminate is subjected to pressure forming using compressed air at a pressure of 1.5 MPa, radius R of an area where the pressure-formed body makes contact with the right angle-shaped portion of the mold is 3.0 mm or smaller.

(24) An anti-reflection film obtained by subjecting the anti-reflection film laminate according to any one of (1) to (23) above to thermoforming and UV curing.

(25) An anti-reflection film comprising the anti-reflection film laminate according to any one of (1) to (23) above.

(26) The anti-reflection film according to either one of (24) and (25) above, wherein the anti-reflection film comprises a cured hard coat layer obtained by curing the uncured hard coat layer, and the refractive index of the substrate layer is 1.49-1.65, and difference between the refractive index of the substrate layer and the refractive index of the cured hard coat layer is 0.04 or smaller.

(27) The anti-reflection film according to any one of (24) to (26) above, wherein the optical interference layer has a low-refractive-index layer having a refractive index lower than that of the substrate layer, and
the refractive index of the substrate layer is 1.49-1.65, and the refractive index of the low-refractive-index layer is 1.31-1.41.

(28) A method for manufacturing an anti-reflection film laminate, comprising:
a first laminating step in which an optical interference layer is laminated on a release surface of a base film to obtain a first laminate;
a second laminating step in which an uncured hard coat layer having a curable hard coat composition is laminated on one side of a substrate layer containing a thermoplastic resin to obtain a second laminate; and
a third laminating step in which the first and second laminates are bonded under pressure such that the optical interference layer of the first laminate and the uncured hard coat layer of the second laminate are in contact with each other.

(29) A method for manufacturing an anti-reflection film laminate comprising:
a first laminating step in which an optical interference layer is laminated on a release surface of a base film, and an adhesive agent layer is laminated on a surface of the optical interference layer on the other side from the release surface to obtain a first laminate;
a second laminating step in which an uncured hard coat layer comprising a curable tack-free hard coat composition is laminated on a surface on one side of a substrate layer containing a transparent resin to obtain a second laminate; and
a third laminating step in which the first and second laminates are bonded under pressure such that the adhesive agent layer of the first laminate and the uncured hard coat layer of the second laminate are in contact with each other.

(30) The method for manufacturing an anti-reflection film laminate according to either one of (28) and (29) above, wherein the optical interference layer laminated in the first laminating step is curable, and the method further comprises, between the first laminating step and the second laminating step, a first curing step in which the optical interference layer is cured.

(31) The method for manufacturing an anti-reflection film laminate according to any one of (28) to (30) above, further comprising, following the third laminating step, a second curing step in which the uncured hard coat layer is cured.

(32) The method for manufacturing an anti-reflection film laminate according to any one of (28) to (31) above, wherein the temperature upon pressure bonding in the third laminating step is 20-100° C.

(33) The method for manufacturing an anti-reflection film laminate according to any one of (28) to (32) above, wherein, in the third laminating step, the first and second laminates are bonded under pressure by applying a pressure of 4 MPa or lower.

Advantageous Effect of the Invention

Thus, in an anti-reflection film laminate of the present invention, an optical interference layer such as a low-refractive-index layer and an uncured hard coat layer are laminated such that they are in contact with each other. Such an anti-reflection film laminate has better formability than at least a laminate having a cured hard coat layer, and is useful for fabricating an anti-reflection film having a high anti-reflection property.

Specifically, an anti-reflection film can be obtained, for example, by subjecting the anti-reflection film laminate to forming and curing steps, and by removing the base film laminated on the optical interference layer as needed.

Therefore, an anti-reflection film fabricated from the anti-reflection film laminate includes an optical interference layer with a controlled refractive index and thus has an excellent anti-reflection property as well as high thermoformability and high scratch resistance.

Since the anti-reflection film of the present invention has such favorable characteristics, it can advantageously be used for applications including a display unit such as a computer, a television or a plasma display, a surface of a polarizing plate used in a liquid crystal display, sunglass lenses, prescription eyeglass lenses, a viewfinder lens used in a camera, a display panel for a vehicle, and a housing for electronic equipment.

BRIEF DESCRIPTION OF THE DRAWINGS

FIG. 1 A cross-sectional view showing a first laminate having a hard coat layer.

FIG. 2 A cross-sectional view showing an example of a second laminate having an optical interference layer.

FIG. 3 A cross-sectional view showing another example of a second laminate having an optical interference layer, which is different from that shown in FIG. 2.

FIG. 4 A cross-sectional view schematically showing a step of further laminating the two laminates.

FIG. 5 Pictures showing elongation of an anti-reflection film after pressure forming, where the anti-reflection film has an evenly spaced grid pattern printed on its surface.

EMBODIMENTS FOR CARRYING OUT THE INVENTION

Hereinafter, the present invention will be described in detail. Note that the present invention is not limited to the following embodiments and may be modified and carried out in any way within the scope that results the effect of the invention.

[1. Anti-Reflection Film Laminate]

An anti-reflection film laminate comprises a base film, an optical interference layer, an uncured hard coat layer and a substrate layer.

The base film facilitates formation of the optical interference layer and protects the optical interference layer by covering the surface of the formed optical interference layer.

The optical interference layer includes, for example, a low-refractive-index layer and the like, where the optical properties of the optical interference layer are controlled. The layers composing the optical interference layer have refractive indices in specific favorable ranges, which differ from that of the substrate layer.

The hard coat layer is mainly composed of a curable material but is yet uncured in the anti-reflection film laminate.

In one preferred embodiment of the anti-reflection film laminate, the optical interference layer and the uncured hard coat layer are laminated such that they are in contact with each other. Moreover, in another preferred embodiment of the anti-reflection film laminate, an adhesive agent layer is interposed between the optical interference layer and the uncured hard coat layer.

The anti-reflection film laminate having the aforementioned layers laminated as above can be subjected to steps such as thermoforming, UV curing or the like to cure the uncured hard coat layer, and the eventually expendable base film can further be peeled off from the optical interference layer as needed, thereby obtaining an anti-reflection film.

Hereinafter, each of the laminated members included in the anti-reflection film laminate will be described.

<Base Film>

The anti-reflection film laminate comprises a base film.

The base film preferably has at least one release surface. The release surface refers to a surface of the base film that is making contact with the optical interference layer described in detail below, and that can be peeled off from the optical interference layer. Specifically, while the base film and the optical interference layer are kept laminated on each other in the anti-reflection film laminate, the base film is peeled off from the laminate once it becomes expendable.

As will be described in detail below, the base film facilitates formation of the optical interference layer and protects the formed optical interference layer, but the base film is not requisite in the anti-reflection film as the end product. Therefore, the base film is peeled off and removed from the optical interference layer as necessary at a suitable timing.

In order to provide a release surface on the base film, for example, a release layer may be laminated on a resin substrate. When a base film has a release layer, the surface of the release layer on the outer side serves as a release surface.

As the material of the base film, a general resin film such as polyethylene terephthalate, polyethylene, polystyrene, polymethylpentene, polypropylene or the like may be used.

A release agent may be applied and dried on a surface of such a substrate made of, for example, a resin, to form a base film having a release surface or a release layer. The process for forming a base film using a release agent may be, for example, application of a silicone-based release agent, application of a long-chain alkyl-based release agent, application of a fluorine-based release agent or the like.

Alternatively, a single-layer base film composed solely of a release agent may be used without using a substrate material such as a thermoplastic resin. Specific examples of the base film include a PET film having a release surface (releasable PET film), and a polyester, polyolefin or polystyrene film.

While the thickness of the base film is not particularly limited, it is preferably 10-200 μm and more preferably 25-50 μm.

<Optical Interference Layer>

An optical interference layer included in the anti-reflection film laminate has an anti-reflection function and includes at least either a low-refractive-index layer or a high-refractive-index layer. The optical interference layer preferably includes at least a low-refractive-index layer.

The optical interference layer is preferably made of a curable material, for example, preferably a UV curable or a thermosetting material. Furthermore, the optical interference layer included in the anti-reflection film laminate is preferably subjected to curing treatment. Specifically, the optical interference layer making up one or more layers of the anti-reflection film laminate preferably has been cured.

(Low Refractive Index Layer)

The optical interference layer preferably has a single or multiple low-refractive-index layers. Specifically, the optical interference layer may have only one low-refractive-index layer or multiple low-refractive-index layers.

The low-refractive-index layer has a refractive index lower than the refractive index of the substrate layer that will be described in detail below. The low-refractive-index layer reduces reflection on an anti-reflection film composed of the anti-reflection film laminate. Therefore, the low-refractive-index layer is preferably provided on the outermost side of the anti-reflection film. In other words, in the anti-reflection film laminate, the low-refractive-index layer is preferably arranged inside the base film that is provided on the outermost side such that the low-refractive-index layer makes contact with the base film.

The low-refractive-index layer preferably contains a polymer of a first resin material containing a fluorine-containing urethane acrylate and a (meth)acrylate. Specifically, the low-refractive-index layer is preferably formed by curing and polymerizing a resin material containing at least a fluorine-containing urethane acrylate and a (meth)acrylate.

Fluorine-Containing Urethane Acrylate

A fluorine-containing urethane acrylate contained in the first resin material of the low-refractive-index layer preferably contains at least a component represented by Formula (2) below.

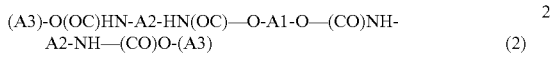

In Formula (2) above, A1 is preferably an optionally substituted alkylene group derived from a fluorine-containing diol with a total of 8 or less carbon atoms, preferably a total of 6 or less carbon atoms, for example, 4 carbon atoms. Examples of the substituent contained in the alkylene group of A1 include an alkyl group.

In Formula (2) above, A2 are each independently an optionally substituted alkylene group derived from an aliphatic or alicyclic isocyanate with a total of 4-20 carbon atoms. The number of carbon atoms in A2 is preferably 6-16 and more preferably 8-12. Examples of the substituent of the alkylene group of A2 include an alkyl group.

Furthermore, an alicyclic isocyanate forming A2 may be, for example, isophorone diisocyanate represented by the following formula.

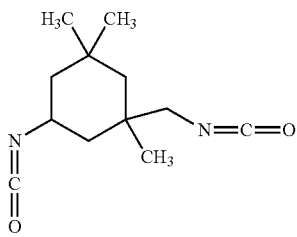 [SMILES: CC1(C)CC(N=C=O)CC(C)(CN=C=O)C1]

In Formula (2) above, A3 are each independently an optionally substituted alkyl group containing at least one (meth)acryloyloxy group with a total of 4-30 carbon atoms. The total number of carbon atoms in A2 is preferably 6-20 and more preferably 8-16. Examples of the substituent of the alkyl group of A3 include a branched alkyl group. A3 preferably contains at least two (meth)acryloyloxy groups, for example, three (meth)acryloyloxy groups.

Furthermore, a compound forming A3 may be, for example, pentaerythritol triacrylate represented by the following formula.

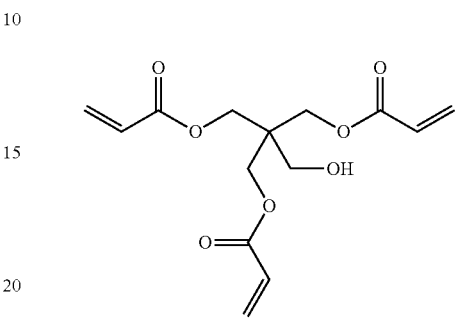

A fluorine-containing urethane acrylate is formed of the aforementioned compounds and may comprise, for example, a compound represented by Formula (3) below.

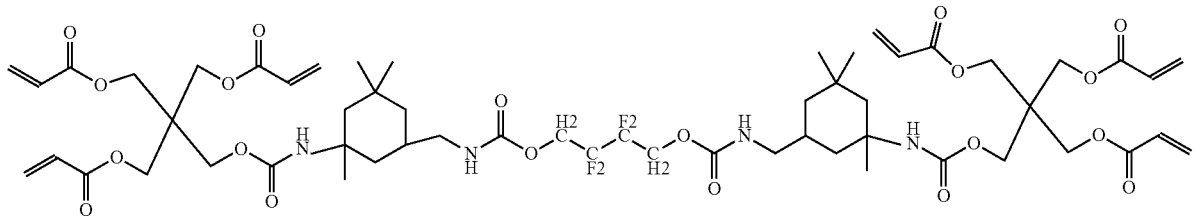

While a fluorine-containing urethane acrylate is preferably used as a monomer material of the low-refractive-index layer as described above, the present invention is not limited thereto. For example, the low-refractive-index layer may be formed using a polymer of a urethane acrylate and a low-refractive-index member described later as main components.

The polymer of a urethane acrylate that may be used in combination with a low-refractive-index member is preferably a urethane acrylate containing a cyclic skeleton. More specifically, examples of the polymer of a urethane acrylate include a polymer of an isocyanate compound and an acrylate compound, or a polymer of an isocyanate compound, an acrylate compound and a polyol compound represented by the formulae below.

Examples of the isocyanate compound include dicyclohexylmethane diisocyanate (H12MDI), isophorone diisocyanate (IPDI) and xylylene diisocyanate (XDI) represented by the formulae below.

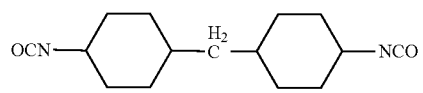

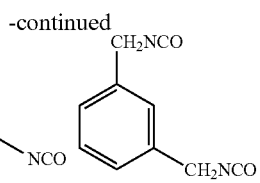

Examples of the acrylate compound include pentaerythritol triacrylate (PETA) and hydroxypropyl (meth)acrylate (hydroxypropyl acrylate: HPA) represented by the formulae below.

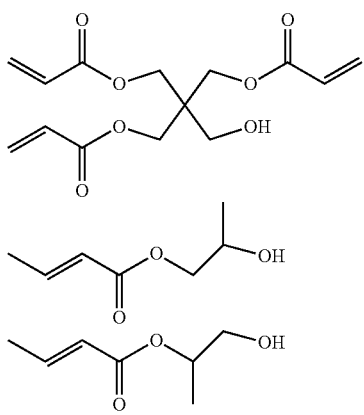

Examples of the polyol compound include tricyclodidecane dimethanol (TCDDM) represented by the formula below.

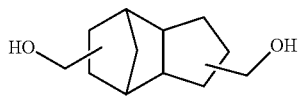

Preferred examples of the above-described urethane acrylate polymer specifically include a polymer of dicyclohexylmethane diisocyanate (H12MDI) and pentaerythritol triacrylate (PETA), a polymer of isophorone diisocyanate (IPDI) and PETA, a polymer of tricyclodidecane dimethanol (TCDDM), IPDI and PETA, a polymer of TCDDM, H12MDI and PETA, and a polymer of xylylene diisocyanate (XDI) and hydroxypropyl (meth)acrylate (HPA).

(Meth)Acrylate in First Resin Material

The (meth)acrylate contained in the first resin material of the low-refractive-index layer is preferably an optionally substituted C4-C20 compound containing at least one (meth)acryloyloxy group and at least one vinyl ether group. The number of carbon atoms in the (meth)acrylate is preferably 6-18 and more preferably 8-16. Examples of the substituent of the (meth)acrylate include an alkyl group.

The (meth)acrylate used may be, for example, 2-(2-vinyloxyethoxy)ethyl (meth)acrylate (VEEA) represented by the formula below.

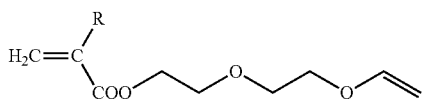

(wherein, R is hydrogen or a methyl group.)

In the first resin material, the ratio between the fluorine-containing urethane acrylate and the (meth)acrylate is preferably 99:1-30:70 (weight ratio), more preferably 97:3-60:40, still more preferably 95:5-80:20, and particularly preferably 90:10-50:50.

Refractive Index of Low-Refractive-Index Layer

The refractive index of the low-refractive-index layer is lower than the refractive index of the substrate layer. The refractive index of the low-refractive-index layer is preferably 1.31-1.41, more preferably 1.32-1.39 and still more preferably about 1.33-1.38.

Furthermore, the difference between the refractive index of the low-refractive-index layer and the refractive index of the substrate layer is preferably at least 0.09, more preferably at least 0.12, still more preferably at least 0.15, and particularly preferably at least 0.17. Accordingly, by increasing the difference between the refractive index of the low-refractive-index layer and the refractive index of the substrate layer, the reflectance of the surface on the low-refractive-index layer side of the anti-reflection film obtained from the anti-reflection film laminate can be increased.

Low-Refractive-Index Member

The low-refractive-index layer preferably contains a low-refractive-index member. The low-refractive-index member is added in order to reduce the refractive index of the low-refractive-index layer. Specifically, the low-refractive-index layer can be formed using a low-refractive-index member so as to increase the difference in refractive index between the low-refractive-index layer and the substrate layer, thereby further reducing the reflectance of the anti-reflection film.

The low-refractive-index member is preferably silica or metal fluoride particles, and more preferably silica, in particular, hollow silica. When metal fluoride particles are used, examples of the metal fluoride contained in the particles include magnesium fluoride, aluminum fluoride, calcium fluoride and lithium fluoride.

The low-refractive-index member is preferably a particulate member, where the particle size (diameter) of the particles of the low-refractive-index member is, for example, but not limited to, 10-200 nm, preferably 30-100 nm, more preferably 35-80 nm, and particularly preferably 45-65 nm.

Other Components

The low-refractive-index layer or the first resin material forming the low-refractive-index layer preferably contains at least either a photoinitiator (photopolymerization initiator) or a leveling agent, and particularly preferably contains a photoinitiator. Additionally, the first resin material may contain a solvent. Examples of the leveling agent include a fluorine-based leveling agent and a silicone-based leveling agent.

The low-refractive-index layer preferably contains the first resin material and the low-refractive-index member at a weight ratio of 20:80-70:30, where the ratio between the first resin material and the low-refractive-index member is more preferably 30:70-65:35 and still more preferably 35:65-60:40.

While the thickness of the low-refractive-index layer is not particularly limited, it is preferably 10-200 nm, more preferably 30-160 nm, still more preferably 50-120 nm, and particularly preferably 80-110 nm.

(High-Refractive-Index Layer)

The optical interference layer preferably has a high-refractive-index layer. More preferably, the optical interference layer has a high-refractive-index layer in addition to the low-refractive-index layer. For example, the optical interference layer has one high-refractive-index layer and one low-refractive-index layer laminated on each other. Alternatively, the optical interference layer may have, for example, a high-refractive-index layer that is directly laminated on a low-refractive-index layer so that they are in contact.

The high-refractive-index layer has a refractive index higher than the refractive index of the substrate layer, and has an anti-reflection function like the low-refractive-index layer.

The high-refractive-index layer preferably contains a polymer of a second resin material containing a (meth)acrylate and a urethane (meth)acrylate derived from a fluorene-based diol, an isocyanate and a (meth)acrylate. Specifically, the high-refractive-index layer is preferably a mixture of at least a (meth)acrylate and a urethane (meth)acrylate that is obtained by dehydration condensation reaction of the three components, i.e., a fluorene-based diol, an isocyanate and a (meth)acrylate.

Urethane (Meth)Acrylate

The urethane (meth)acrylate contained in the second resin material of the high-refractive-index layer preferably contains at least a component represented by Formula (4) below.

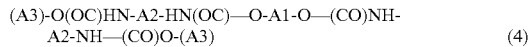

(In Formula (4),

A1 is a structural unit derived from a fluorene-based diol,

A2 are each independently a structural unit derived from an optionally substituted isocyanate, A3 are each independently an optionally substituted (for example, with an aryl group) alkyl group containing at least one (meth)acryloyloxy group with a total of 4-30 carbon atoms, where the number of the (meth)acryloyloxy groups is preferably 1-3 and the total number of carbon atoms is preferably 8-24.)

Fluorene-Based Diol (A1)

Typical examples of the fluorene-based diol for forming the above-described structural unit of A1, i.e., a compound having a fluorene skeleton, specifically include the followings. Herein, the fluorene-based diol comprises a fluorene compound containing three of more hydroxyl groups.

Specifically, examples of the fluorene-based diol having two hydroxyl groups include 9,9-bis(hydroxyphenyl)fluorenes, 9,9-bis(hydroxy(poly)alkoxyphenyl)fluorenes, 9,9-bis(hydroxynaphthyl)fluorenes and 9,9-bis(hydroxy(poly)alkoxynaphthyl)fluorenes.

Furthermore, examples of the fluorene-based diol having three or more hydroxyl groups include 9,9-bis(polyhydroxyphenyl)fluorenes, 9,9-bis[poly(hydroxy(poly)alkoxy)phenyl]fluorenes, 9,9-bis(polyhydroxynaphthyl)fluorenes and 9,9-bis[poly(hydroxy(poly)alkoxy)naphthyl]fluorenes.

Examples of the 9,9-bis(hydroxyphenyl)fluorenes include a 9,9-bis(hydroxyphenyl)fluorene [9,9-bis(4-hydroxyphenyl)fluorene (bisphenol fluorene), etc.], and a substituted 9,9-bis(hydroxyphenyl)fluorene {for example, a 9,9-bis(alkyl-hydroxyphenyl)fluorene [a 9,9-bis(mono- or di-(C1-C4 alkyl)-hydroxyphenyl)fluorene such as 9,9-bis(4-hydroxy-3-methylphenyl)fluorene (biscresol fluorene), 9,9-bis(4-hydroxy-3-ethylphenyl)fluorene, 9,9-bis(4-hydroxy-3-butylphenyl)fluorene, 9,9-bis(3-hydroxy-2-methylphenyl)fluorene, 9,9-bis(4-hydroxy-3,5-dimethylphenyl)fluorene and 9,9-bis(4-hydroxy-2,6-dimethylphenyl)fluorene, etc.], a 9,9-bis(cycloalkyl-hydroxyphenyl)fluorene [a 9,9-bis(mono- or di-(C5-C8 cycloalkyl)-hydroxyphenyl)fluorene such as 9,9-bis(4-hydroxy-3-cyclohexylphenyl)fluorene, etc.], a 9,9-bis(aryl-hydroxyphenyl)fluorene [for example, a 9,9-bis(mono- or di-(C6-C8 aryl)-hydroxyphenyl)fluorene such as 9,9-bis(4-hydroxy-3-phenylphenyl)fluorene, etc.], and a 9,9-bis(aralkyl-hydroxyphenyl)fluorene [for example, a 9,9-bis(C6-C8 aryl C1-C2 alkyl-hydroxyphenyl)fluorene such as 9,9-bis(4-hydroxy-3-benzylphenyl)fluorene, etc.], etc.}).

Examples of the 9,9-bis(hydroxy(poly)alkoxyphenyl)fluorenes include a 9,9-bis(hydroxyalkoxyphenyl)fluorene {for example, a 9,9-bis(hydroxy C2-C4 alkoxyphenyl)fluorene such as 9,9-bis[4-(2-hydroxyethoxy)phenyl]fluorene, 9,9-bis[4-(2-hydroxypropoxy)phenyl]fluorene, 9,9-bis[4-(3-hydroxypropoxy)phenyl]fluorene and 9,9-bis[4-(4-hydroxybutoxy)phenyl]fluorene, etc.}, a 9,9-bis(hydroxyalkoxy-alkylphenyl)fluorene {for example, a 9,9-bis(hydroxy(C2-C4 alkoxy)-mono- or di-(C1-C6 alkylphenyl))fluorene such as 9,9-bis[4-(2-hydroxyethoxy)-3-methylphenyl]fluorene [or 2,2'-dimethyl-4,4-(9-fluorenylidene)-bisphenoxyethanol], 9,9-bis[2-(2-hydroxyethoxy)-5-methylphenyl]fluorene, 9,9-bis[4-(2-hydroxyethoxy)-3-ethylphenyl]fluorene, 9,9-bis[4-(2-hydroxyethoxy)-3-propylphenyl]fluorene, 9,9-bis[4-(3-hydroxypropoxy)-3-methylphenyl]fluorene, 9,9-bis[4-(4-hydroxybutoxy)-3-methylphenyl]fluorene, 9,9-bis[4-(2-hydroxyethoxy)-3,5-dimethylphenyl]fluorene [or 2,2',6,6'-tetramethyl-4,4'-(9-fluorenylidene)-bisphenoxyethanol], 9,9-bis[4-(2-hydroxyethoxy)-3,5-diethylphenyl]fluorene, 9,9-bis[4-(3-hydroxypropoxy)-3,5-dimethylphenyl]fluorene and 9,9-bis[4-(4-hydroxybutoxy)-3,5-dimethylphenyl]fluorene, etc.}, a 9,9-bis(hydroxyalkoxy-cycloalkylphenyl)fluorene {for example, a 9,9-bis(hydroxy(C2-C4 alkoxy)-mono- or di-(C5-C8 cycloalkyl)phenyl)fluorene such as 9,9-bis[4-(2-hydroxyethoxy)-3-cyclohexylphenyl]fluorene, etc.}, a 9,9-bis(hydroxyalkoxy-arylphenyl)fluorene {for example, a 9,9-bis(hydroxy(C2-C4 alkoxy)-mono- or di-(C6-C8 aryl)phenyl)fluorene such as 9,9-bis[4-(2-hydroxyethoxy)-3-phenylphenyl]fluorene [or 2,2'-diphenyl-4,4'-(9-fluorenylidene)-bisphenoxyethanol] and 9,9-bis[4-(2-hydroxyethoxy)-3,5-diphenylphenyl]fluorene, etc.}, a 9,9-bis(hydroxyalkoxy-aralkylphenyl)fluorene {for example, a 9,9-bis[hydroxy(C2-C4 alkoxy)-mono- or di-(C6-C8 aryl C1-C4 alkyl)phenyl]fluorene such as 9,9-bis[4-(2-hydroxyethoxy)-3-benzylphenyl]fluorene and 9,9-bis[4-(2-hydroxyethoxy)-3,5-dibenzylphenyl]fluorene}, and 9,9-bis(hydroxypolyalkoxyphenyl)fluorenes corresponding to these 9,9-bis(hydroxyalkoxyphenyl)fluorenes, where n is 2 or more in Formula (1) above {for example, a 9,9-bis[(hydroxy C2-C4 alkoxy) C2-C4 alkoxyphenyl]fluorene (compound wherein n=2) such as 9,9-bis {4-[2-(2-hydroxyethoxy)ethoxy]phenyl}fluorene, etc.}.

Examples of the 9,9-bis(hydroxynaphthyl)fluorenes include 9,9-bis(hydroxynaphthyl)fluorenes {for example, an optionally substituted 9,9-bis(monohydroxynaphthyl)fluorene such as 9,9-bis[6-(2-hydroxynaphthyl)]fluorene (or 6,6-(9-fluorenylidene)-di(2-naphthol)), 9,9-bis[1-(6-hydroxynaphthyl)]fluorene (or 5,5-(9-fluorenylidene)-di(2-naphthol)) and 9,9-bis[1-(5-hydroxynaphthyl)]fluorene (or 5,5-(9-fluorenylidene)-di(1-naphthol))}.

Examples of the 9,9-bis(hydroxy(poly)alkoxynaphthyl)fluorenes include compounds corresponding to the aforementioned 9,9-bis(hydroxynaphthyl)fluorenes such as a 9,9-bis(hydroxyalkoxynaphthyl)fluorene {for example, an optionally substituted 9,9-bis(hydroxy C2-C4 alkoxynaphthyl)fluorene such as 9,9-bis[6-(2-(2-hydroxyethoxy)naphthyl)]fluorene, 9,9-bis[1-(6-(2-hydroxyethoxy)naphthyl)]fluorene [or 5,5'-(9-fluorenylidene)-bis(2-naphthyloxyethanol)] and 9,9-bis[1-(5-(2-hydroxyethoxy)naphthyl)]fluorene, etc.}.

Examples of the 9,9-bis(polyhydroxyphenyl)fluorenes include 9,9-bis(dihydroxyphenyl)fluorenes and 9,9-bis(trihydroxyphenyl)fluorenes. Examples of the 9,9-bis(dihydroxyphenyl)fluorenes include a 9,9-bis(dihydroxyphenyl)fluorene [9,9-bis(3,4-dihydroxyphenyl)fluorene (bis-catechol fluorene), 9,9-bis(3,5-dihydroxyphenyefluorene, etc.], a substituted 9,9-bis(dihydroxyphenyl)fluorene {for example, 9,9-bis(alkyl-dihydroxyphenyl)fluorene [a 9,9-bis (mono- or di-(C1-C4 alkyl)-dihydroxyphenyl)fluorene such as 9,9-bis(3,4-dihydroxy-5-methylphenyl)fluorene, 9,9-bis(3,4-dihydroxy-6-methylphenyl)fluorene, 9,9-bis(2,4-dihydroxy-3,6-dimethylphenyl)fluorene, etc.], a 9,9-bis(aryl-dihydroxyphenyl)fluorene [for example, a 9,9-bis(mono- or di-(C6-C8 aryl)-dihydroxyphenyl)fluorene such as 9,9-bis(3,4-dihydroxy-5-phenylphenyl)fluorene, etc.], and a 9,9-bis(alkoxy-dihydroxyphenyl)fluorene [for example, a 9,9-bis (mono- or di-C1-C4 alkoxy-dihydroxyphenyl)fluorene such as 9,9-bis(3,4-dihydroxy-5-methoxyphenyl)fluorene], etc.}.

Examples of the 9,9-bis(trihydroxyphenyl)fluorenes include a 9,9-bis(trihydroxyphenyl)fluorene [for example, 9,9-bis(2,4,6-trihydroxyphenyl)fluorene, 9,9-bis(2,4,5-trihydroxyphenyl)fluorene, 9,9-bis(3,4,5-trihydroxyphenyl)fluorene, etc.].

Examples of the 9,9-bis[poly(hydroxy(poly)alkoxy)phenyl]fluorenes include 9,9-bis[di(hydroxy(poly)alkoxy)phenyl]fluorenes and 9,9-bis[tri(hydroxy(poly)alkoxy)phenyl]fluorenes.

Examples of the 9,9-bis[di(hydroxy(poly)alkoxy)phenyl]fluorenes include 9,9-bis[di(hydroxyalkoxy)phenyl]fluorenes including a 9,9-bis[di(hydroxyalkoxy)phenyl]fluorene {for example, a 9,9-bis[di(hydroxy C2-C4 alkoxy)phenyl]fluorene such as 9,9-bis[3,4-di(2-hydroxyethoxy)phenyl]fluorene [or 2,2'-bishydroxyethoxy-4,4'-(9-fluorenylidene)-bisphenoxyethanol], 9,9-bis[3,5-di(2-hydroxyethoxy)phenyl]fluorene [or 3,3'-bishydroxyethoxy-5,5'-(9-fluorenylidene)-bisphenoxyethanol], 9,9-bis[3,4-di(3-hydroxypropoxy)phenyl]fluorene, 9,9-bis[3,5-di(3-hydroxypropoxy)phenyl]fluorene, 9,9-bis[3,4-di(2-hydroxypropoxy)phenyl]fluorene, 9,9-bis[3,5-di(2-hydroxypropoxy)phenyl]fluorene, 9,9-bis[3,4-di(4-hydroxybutoxy)phenyl]fluorene and 9,9-bis[3,5-di(4-hydroxybutoxy)phenyl]fluorene}, an optionally substituted 9,9-bis[di(hydroxyalkoxy)phenyl]fluorene {for example, a 9,9-bis[alkyl-di(hydroxyalkoxy)phenyl]fluorene [for example, a 9,9-bis[mono- or di-(C1-C4 alkyl)-di(hydroxy C2-C4 alkoxy)phenyl]fluorene such as 9,9-bis[3,4-di(2-hydroxyethoxy)-5-methylphenyl]fluorene, 9,9-bis[3,4-di(2-hydroxyethoxy)-6-methylphenyl]fluorene and 9,9-bis[2,4-di(2-hydroxyethoxy)-3,6-dimethylphenyl]fluorene, etc.], a 9,9-bis[aryl-di(hydroxyalkoxy)phenyl]fluorene [for example, a 9,9-bis[mono- or di-(C6-C8 aryl)-di(hydroxy C2-C4 alkoxy)phenyl]fluorene such as 9,9-bis[3,4-di(2-hydroxyethoxy)-5-arylphenyl]fluorene, etc.], a 9,9-bis[alkoxy-di(hydroxyalkoxy)phenyl]fluorene [for example, a 9,9-bis [mono- or di-C1-C4 alkoxy-di(hydroxy C2-C4 alkoxy)phenyl]fluorene such as 9,9-bis[3,4-di(2-hydroxyethoxy)-5-methoxyphenyl]fluorene, etc.], etc.}; and 9,9-bis[di(hydroxypolyalkoxy)phenyl]fluorenes corresponding to these 9,9-bis[di(hydroxyalkoxy)phenyl]fluorenes, where n is 2 or more in Formula (1) above {for example, a 9,9-bis[di(hydroxy C2-C4 alkoxy C2-C4 alkoxy]phenyl]fluorene (compound wherein n=2) such as 9,9-bis{3,4-di[2-(2-hydroxyethoxy)ethoxy]phenyl}fluorene and 9,9-bis{3,5-di[2-(2-hydroxyethoxy)ethoxy]phenyl}fluorene, etc.}.

Examples of the 9,9-bis[tri(hydroxy(poly)alkoxy)phenyl]fluorenes include compounds corresponding to the aforementioned 9,9-bis[di(hydroxy(poly)alkoxy)phenyl]fluorenes such as a 9,9-bis[tri(hydroxyalkoxy)phenyl]fluorene {for example, a 9,9-bis[tri(hydroxy C2-C4 alkoxy)phenyl] fluorene such as 9,9-bis[2,3,4-tri(2-hydroxyethoxy)phenyl] fluorene [or 2,2',6,6'-tetrahydroxyethoxy-5,5'-(9-fluorenylidene)-bisphenoxyethanol], 9,9-bis[2,4,6-tri(2-hydroxyethoxy)phenyl]fluorene, 9,9-bis[2,4,5-tri(2-hydroxyethoxy)phenyl]fluorene and 9,9-bis[3,4,5-tri(2-hydroxyethoxy)phenyl]fluorene}, and 9,9-bis[tri(hydroxypolyalkoxy)phenyl]fluorenes corresponding to these 9,9-bis[tri(hydroxyalkoxy)phenyl]fluorenes, where n is 2 or more in Formula (1) above {for example, a 9,9-bis[tri(hydroxy C2-C4 alkoxy C2-C4 alkoxy]phenyl]fluorene (compound wherein n=2) such as 9,9-bis{2,4,6-tri[2-(2-hydroxyethoxy)ethoxy]phenyl}fluorene, 9,9-bis{2,4,5-tri[2-(2-hydroxyethoxy)ethoxy]phenyl}fluorene, 9,9-bis{3,4,5-tri[2-(2-hydroxyethoxy)ethoxy]phenyl}fluorene, etc.}.

Examples of the 9,9-bis(polyhydroxynaphthyl)fluorenes include compounds corresponding to the aforementioned 9,9-bis(hydroxynaphthyl)fluorenes such as a 9,9-bis(di- or tri-hydroxynaphthyl)fluorene.

Moreover, examples of the 9,9-bis[poly(hydroxy(poly)alkoxy)naphthyl]fluorenes include compounds corresponding to the above-described 9,9-bis(hydroxy(poly)alkoxynaphthyl)fluorenes, for example, a 9,9-bis[di- or tri-(hydroxy(poly)alkoxy)naphthyl]fluorenes such as a 9,9-bis [di- or tri-(hydroxy C2-C4 alkoxy)naphthyl]fluorene.

Preferred examples of the above-described fluorene-based diol specifically include 9,9-bis[4-(2-hydroxyethoxy)phenyl]fluorene.

<Isocyanate (A2)>

The isocyanate for forming the above-described structural unit of A2 is not particularly limited and examples thereof include aromatic, aliphatic and alicyclic isocyanates.

Examples of the isocyanate include polyisocyanates such as tolylene diisocyanate, diphenylmethane diisocyanate, hydrogenated diphenylmethane diisocyanate, polyphenylmethane polyisocyanate, modified diphenylmethane diisocyanate, hydrogenated xylylene diisocyanate, xylylene diisocyanate, hexamethylene diisocyanate, trimethyl hexamethylene diisocyanate, tetramethyl xylylene diisocyanate, isophorone diisocyanate, norbornene diisocyanate, 1,3-bis(isocyanatomethyl)cyclohexane, phenylene diisocyanate, lysine diisocyanate, lysine triisocyanate and naphthalene diisocyanate, trimer compounds or tetramer compounds of such polyisocyanates, biuret polyisocyanates, water-dispersed polyisocyanates (for example, "AQUANATE 100", "AQUANATE 110", "AQUANATE 200", "AQUANATE 210", etc. manufactured by Nippon Polyurethane Industry Co., Ltd.); and reaction products of such polyisocyanates and polyols.

Among these isocyanates, an aromatic isocyanate compound such as xylylene diisocyanate is favorable since a high refractive index can be realized easily.

(Meth)Acryloyloxy Group-Containing Alkyl Group (A3)

Preferred examples of the component for forming the above-described alkyl group of A3 specifically include monofunctional (meth)acrylic compounds having a hydroxyl group.

Examples of the monofunctional (meth)acrylic compounds having a hydroxyl group include hydroxyl group-containing mono(meth)acrylates {for example, hydroxyalkyl (meth)acrylates [for example, a hydroxy C2-C20 alkyl-(meth)acrylate such as 2-hydroxyethyl (meth)acrylate, 3-hydroxypropyl (meth)acrylate and 6-hydroxyhexyl (meth) acrylate, preferably a hydroxy C2-C12 alkyl-(meth)acrylate and more preferably a hydroxy C2-C6 alkyl-(meth)acrylate], polyalkylene glycol mono(meth)acrylates [for example, a poly C2-C4 alkylene glycol mono(meth)acrylate such as diethylene glycol mono(meth)acrylate and polyethylene glycol mono(meth)acrylate], mono(meth)acrylates of polyol having three or more hydroxyl groups [for example, an alkane polyol mono(meth)acrylate such as glycerol mono (meth)acrylate and trimethylolpropane mono(meth)acrylate, a mono(meth)acrylate of a multimer of alkane polyol such as diglycerol mono(meth)acrylate, etc.], etc.}, a N-hydroxyalkyl (meth)acrylamide (for example, N-hydroxy C1-C4 alkyl (meth)acrylamide such as N-methylol (meth)acrylamide and N-(2-hydroxyethyl) (meth)acrylamide, etc.), and adducts obtained by addition of lactone (for example, a C4-C10 lactone such as ε-caprolactone) to hydroxyl groups of these compounds (for example, hydroxyalkyl (meth)acrylate) (for example, adducts obtained by addition of about 1-5 moles of lactone).

Note that these (meth)acrylic compounds may be used solely, or two or more of them may be used in combination.

Preferred examples of the compound for forming the (meth)acryloyloxy group-containing alkyl group (A3) specifically include 2-hydroxy-3-phenoxypropyl acrylate.

Preferred examples of the urethane (meth)acrylate contained in the second resin material specifically include the following compounds.

late, the same kind of compound as those of the (meth) acrylate contained in the first resin material can be employed.

The (meth)acrylate contained in the second resin material is preferably an optionally substituted C4-C20 compound containing at least one (meth)acryloyloxy group and at least one vinyl ether group. The number of carbon atoms in the (meth)acrylate is preferably 6-18 and more preferably 8-16. The substituent of the (meth)acrylate may be an alkyl group or the like.

As the (meth)acrylate, for example, 2-(2-vinyloxyethoxy) ethyl (meth)acrylate [2-(2-vinyloxyethoxy)ethyl acrylate: VEEA] is used.

Furthermore, preferred examples of the (meth)acrylate contained in the second resin material specifically include a bisphenol A di(meth)acrylate compound having an ethoxy group. Preferred examples of the bisphenol A di(meth) acrylate compound having an ethoxy group specifically include ethoxylated (3 mol) bisphenol A di(meth)acrylate, ethoxylated (4 mol) bisphenol A di(meth)acrylate, ethoxy-

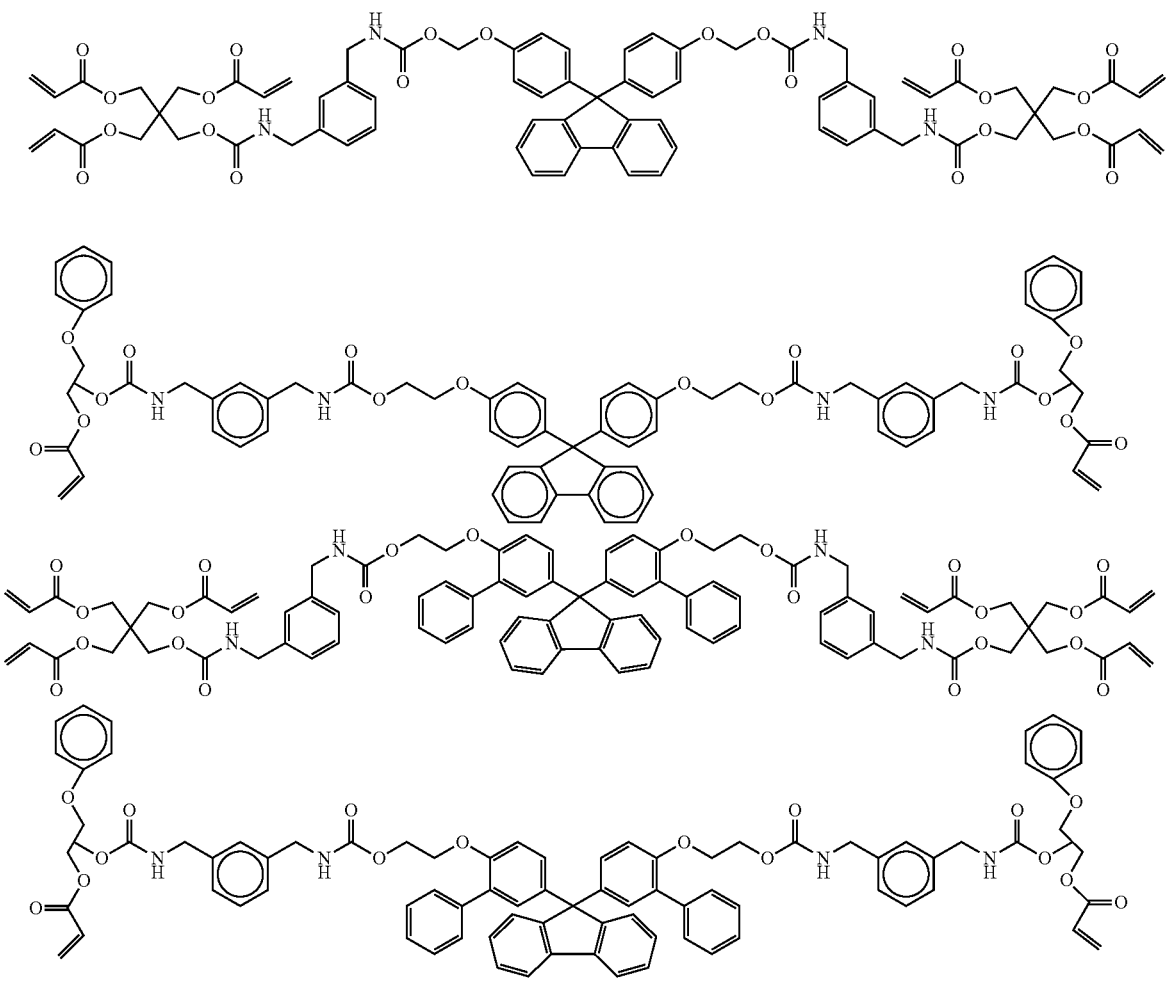

(Meth)Acrylate of Second Resin Material

As the (meth)acrylate contained in the second resin material, namely, a (meth)acrylate that is preferably used in combination with the above-described urethane (meth)acrylated (10 mol) bisphenol A di(meth)acrylate, and propoxylated (3 mol) bisphenol A diacrylate, and more preferred examples specifically include ethoxylated (4 mol) bisphenol A di(meth)acrylate.

The ratio between the urethane (meth)acrylate and the (meth)acrylate in the second resin material is preferably 99:1-50:50 (weight ratio), more preferably 95:5-70:30, still more preferably 93:7-80:20, and particularly preferably, 90:10-85:15.

The refractive index of the high-refractive-index layer is preferably 1.68-1.75, more preferably 1.69-1.74, and still more preferably about 1.70-1.73.

Furthermore, the difference between the refractive index of the high-refractive-index layer and the refractive index of the substrate layer is preferably at least 0.09, more preferably at least 0.12, still more preferably at least 0.15, and particularly preferably at least 0.17. Moreover, the difference between the refractive index of the high-refractive-index layer and the refractive index of the substrate layer is, for example, in a range of 0.03-0.70, preferably 0.10-0.50, and still more preferably 0.15-0.26. Accordingly, the difference between the refractive index of the high-refractive-index layer and the refractive index of the substrate layer can be increased to further reduce the reflectance of the surface on the optical interference layer side of the anti-reflection film obtained from the anti-reflection film laminate.

High Refractive Index Member

The high-refractive-index layer preferably contains a high refractive index member. The high refractive index member is added to increase the refractive index of the high-refractive-index layer. Specifically, the high refractive index member is used to form the high-refractive-index layer so as to increase the difference in refractive index between the high-refractive-index layer and the substrate layer, thereby further reducing the reflectance of the anti-reflection film.

Examples of the high refractive index member include titanium oxide, zirconium oxide ($ZrO_2$), zinc oxide, alumina, colloidal alumina, lead titanate, red lead, chrome yellow, zinc yellow, chromium oxide, ferric oxide, iron black, copper oxide, magnesium oxide, magnesium hydroxide, strontium titanate, yttrium oxide, hafnium oxide, niobium oxide, tantalum oxide ($Ta_2O_5$), barium oxide, indium oxide, europium oxide, lanthanum oxide, zircon, tin oxide and lead oxide, and double oxides thereof such as lithium niobate, potassium niobate, lithium tantalate and aluminum-magnesium oxide ($MgAl_2O_4$).

Moreover, a rare-earth oxide can be used as the high refractive index member. For example, scandium oxide, yttrium oxide, lanthanum oxide, cerium oxide, praseodymium oxide, neodymium oxide, samarium oxide, europium oxide, gadolinium oxide, terbium oxide, dysprosium oxide, holmium oxide, erbium oxide, thulium oxide, ytterbium oxide, lutetium oxide or the like can be used.

Among a number of the aforementioned options, zirconia (zirconium oxide) is preferably used as the high-reference-index member.

The high refractive index member is preferably a particulate member. While the particle size (diameter) of the particulate high refractive index member is not particularly limited, it is, for example, 1-100 nm, preferably 5-50 nm, more preferably 7.5-30 nm and particularly preferably 10-25 nm.

Furthermore, the particulate high refractive index member, for example, preferably contains an organic coating layer, namely, a surface treated layer for covering the outer surface of a metal oxide or the like. The organic coating layer enhances compatibility of the high refractive index member with the resin material forming the high-refractive-index layer, and allows the high refractive index member to firmly bond to the resin material.

The surface treated layer is preferably an organic coating layer which has an UV reactive (curable) functional group introduced into the surface thereof.

The high-refractive-index layer contains the second resin material and the high refractive index member preferably at a weight ratio of 10:90-40:60. The ratio between the second resin material and the high-refractive-index member is more preferably 15:85-35:65, and still more preferably 20:80-30:70.

While the thickness of the high-refractive-index layer is not particularly limited, it is preferably 10-300 nm, more preferably 50-250 nm, still more preferably 100-180 nm, and particularly preferably 130-170 nm.

If the optical interference layer has the low-refractive-index layer and the high-refractive-index layer, the high-refractive-index layer is preferably interposed between the substrate layer and the low-refractive-index layer. An anti-reflection film having such a laminate structure ensures reduction of the reflectance of the film as a whole.

Other Components

The high-refractive-index layer or the second resin material forming the high-refractive-index layer preferably contains at least either of a photoinitiator or a leveling agent, preferably a photoinitiator. In addition, the second resin material may contain a solvent. Examples of the leveling agent include a fluorine-based leveling agent, an acrylic leveling agent and a silicone-based leveling agent.

<Uncured Hard Coat Layer>

The anti-reflection film laminate has an uncured hard coat layer. The uncured hard coat layer can be cured to provide a hard coat layer in an anti-reflection film obtained from the anti-reflection film laminate, thereby enhancing surface hardness and scratch resistance of the film.

The uncured hard coat layer is preferably laminated on the surface of the above-described optical interference layer on the other side from the base film. For example, the uncured hard coat layer is laminated to make contact with the optical interference layer, and preferably bonded with the optical interference layer under pressure. Note that an additional layer, for example, an adhesive agent layer described in detail below, may be provided between the uncured hard coat layer and the optical interference layer.

Furthermore, the uncured hard coat layer is preferably interposed between the substrate layer and the optical interference layer. For example, in an anti-reflection film laminate comprising a low-refractive-index layer, a high-refractive-index layer and a hard coat layer, the hard coat layer is preferably interposed between the substrate layer and the high-refractive-index layer. Specifically, in an anti-reflection film laminate comprising a substrate layer, a low-refractive-index layer, a high-refractive-index layer and a hard coat layer, the substrate layer, the hard coat layer, the high-refractive-index layer and the low-refractive-index layer are preferably laminated in this order.

The uncured hard coat layer has a curable hard coat composition. The uncured hard coat layer is preferably formed on the surface of the substrate layer described in detail below. Specifically, a thermosetting or active-energy-ray-curable hard coat material is preferably applied to the surface of the substrate layer to form an uncured hard coat layer.

The hard coat composition preferably contains at least either one of an acrylate monomer and an acrylate oligomer, preferably at least a urethane acrylate oligomer.

Examples of the active-energy-ray-curable coating material that may be used as the hard coat composition include a resin composition composed of one or more monofunctional or polyfunctional acrylate monomers or oligomers or the like, more preferably a resin composition containing a urethane acrylate oligomer. A photopolymerization initiator is preferably added as a curing catalyst to such a resin composition.

Examples of the active-energy-ray-curable hard coat coating material include a hard coat coating material obtained by adding 1-10 parts by weight of a photopolymerization initiator to 100 parts by weight of a photopolymerizable resin composition obtained by mixing 40-95% by weight of a hexafunctional urethane acrylate oligomer and 5-60% by weight of a (meth)acrylate such as 2-(2-vinyloxyethoxy) ethyl (meth)acrylate [2-(2-vinyloxyethoxy)ethyl acrylate: VEEA].

Furthermore, the aforementioned photopolymerization initiator may be a generally known photopolymerization initiator. Examples of such a photopolymerization initiator specifically include benzoin, benzophenone, benzoin ethyl ether, benzoin isopropyl ether, 2,2-dimethoxy-2-phenylacetophenone, 1-hydroxycyclohexyl phenyl ketone, 2-hydroxy-2-methyl-1-phenylpropane-1-one, azobis(isobutyronitrile) and benzoyl peroxide.

Examples of the thermosetting resin coating material used as the hard coat composition include polyorganosiloxane-based and crosslinked acrylic resin compositions. Such resin compositions are commercially available as hard coat agents for acrylic resins or polycarbonate resins, and may suitably be selected by considering suitability with the coating line.

The uncured hard coat layer preferably contains a curable tack-free hard coat composition. A hard coat composition with an excellent tack-free property is used so that, even in an uncured state, the hard coat composition can retain its given shape even when touched by other object such as a hand of the worker, and the hard coat composition can be prevented from partially transferring to the surface of the touching object. Thus, the tack-free hard coat composition can facilitate fabrication in which curing is performed after forming a shape suitable for any of the various applications. Moreover, it can also facilitate the hard coat composition in an uncured state to be stored or distributed while keeping its given shape.

On the other hand, a resin composition with a poor tack-free property, for example, a resin composition having a low-molecular weight oligomer as the main component, requires a step of curing before it is formed into a shape suitable for any of the various applications, rendering it poor in formability.

Preferably, the tack-free hard coat composition is curable by irradiation with an energy ray or the like, and contains a (meth)acryloyl polymer and inorganic oxide nanoparticles. As will be described in detail below, the hard coat composition has excellent formability and tack-free property prior to curing and can realize high hardness and scratch resistance once it is cured to form a hard coat layer.

The hard coat composition preferably contains 20-80% by weight of a (meth)acryloyl polymer and 80-20% by weight of inorganic oxide nanoparticles, relative to the total weight of the hard coat composition. More preferably, the hard coat composition contains 30-70% by weight of a (meth)acryloyl polymer and 70-30% by weight of inorganic oxide nanoparticles, and still more preferably 40-60% by weight of a (meth)acryloyl polymer and 60-40% by weight of inorganic oxide nanoparticles.

(Meth)Acryloyl Polymer

The (meth)acryloyl polymer preferably has a (meth)acrylate equivalent of 200-500 g/eq. The (meth)acrylate equivalent of the (meth)acryloyl polymer is preferably 220-450 g/eq, and more preferably 250-400 g/eq.

The (meth)acryloyl polymer also preferably has a double bond equivalent of 100-1000 g/eq, where the double bond equivalent of the (meth)acryloyl polymer is more preferably 150-800 g/eq, still more preferably 200-600 g/eq, and particularly preferably 250-400 g/eq.

Furthermore, the (meth)acryloyl polymer preferably has a weight-average molecular weight of 5,000-200,000. The weight-average molecular weight of the (meth)acryloyl polymer is preferably 10,000-150,000, more preferably 15,000-100,000, and still more preferably 18,000-50,000.

The weight-average molecular weight can be measured based on the description in paragraphs 0061-0064 of Japanese Unexamined Patent Application Publication No. 2007-179018. The detail of the measurement method will be described hereinbelow.

TABLE 1

| Conditions for measuring weight-average molecular weight | |
|---|---|
| Device | "Aliance" manufactured by Waters |
| Column | "Shodex K-805L" manufactured by Showa Denko K.K. (2 columns) |
| Detector | UV detector: 254 nm |
| Eluent | Chloroform |

Herein, (meth)acrylates comprise both acrylates and methacrylates.

Thus, a hard coat composition containing a (meth)acryloyl polymer having a (meth)acrylate equivalent and a weight-average molecular weight in predetermined ranges has a good tack-free property prior to curing, has good scratch resistance after curing, and can facilitate the curing and polymerization reactions.

The (meth)acryloyl polymer contained in the hard coat composition preferably has a repeat unit represented by Formula (I) below.

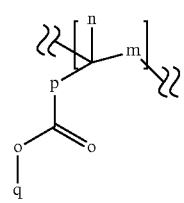

(I)

In Formula (I), m is a C1-C4 alkylene group or a single bond, n is a C1-C4 alkyl group or hydrogen, p is a single bond or a C1 or C2 alkylene group, and q is an alkyl group with a total of 1-12 carbon atoms which may contain at least any substituent selected from an epoxy group, a hydroxy group, an acryloyl group and a methacryloyl group, or hydrogen.

The (meth)acryloyl polymer more preferably contains the following repeat unit, specifically, a repeat unit represented by Formula (I) above, wherein m is a C1 or C2 alkylene group, n is a C1 or C2 alkyl group, p is a single bond or a methylene group, and q is an alkyl group with a total of 1-6 carbon atoms which may contain at least any substituent selected from a glycidyl group, a hydroxy group and an acryloyl group, or hydrogen.

For example, in Formula (I) above, m is a methylene group, n is a methyl group, p is a single bond, and q is an alkyl group containing a methyl group and a glycidyl group (an epoxy group) with 5 or less carbon atoms, an alkyl group containing a hydroxy group and an acryloyl group with 8 or less carbon atoms, or the like.

Examples of the repeat unit contained in the (meth) acryloyl polymer specifically include those represented by Formulae (II-a), (II-b) and (II-c) below.

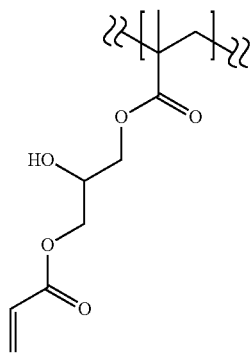

(II-a)

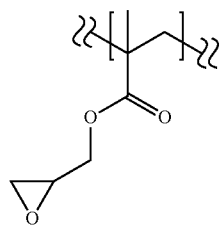

(II-b)

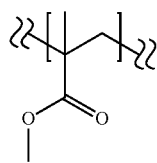

(II-c)

In the (meth)acryloyl polymer, the repeat unit of Formula (II-a) above is contained in an amount of preferably 30-85 mol % and more preferably 40-80 mol % relative to the total number of moles of the repeat units of Formulae (II-a), (II-b) and (II-c) above. The repeat unit of Formula (II-b) above is contained an amount of preferably 5-30 mol % and more preferably 10-25 mol % relative to the aforementioned total number of moles. Furthermore, the repeat unit of Formula (II-c) above is contained an amount of preferably 10-40 mol % and more preferably 10-35 mol % relative to the aforementioned total number of moles.

In addition, the repeat units of Formulae (II-a), (II-b) and (II-c) above are preferably in a mole ratio of 5:2:3.

The (meth)acryloyl polymer may be added with a pentaerythritol-based polyfunctional acrylate compound. For example, pentaerythritol tetraacrylate or dipentaerythritol hexaacrylate represented by Formula (III-a) or (III-b) below, respectively, or pentaerythritol triacrylate or the like can be used as the polyfunctional acrylate compound.

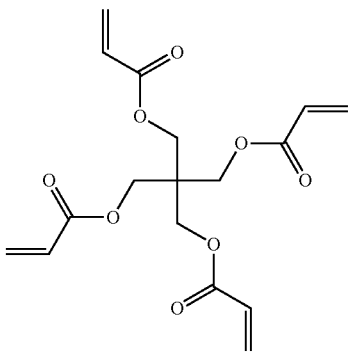

(III-a)

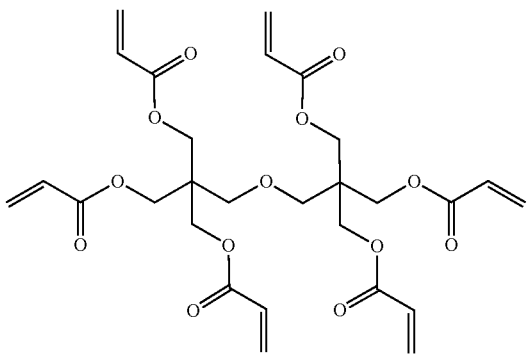

(III-b)

The polyfunctional acrylate compound is contained in an amount of preferably 70% or less by weight and more preferably at 50% or less by weight relative to the total weight with the (meth)acryloyl polymer. Accordingly, the polyfunctional acrylate compound can be added to the hard coat composition so as to allow reaction with the acryloyl group, the glycidyl group (epoxy group) and the hydroxy group contained in the side chains of the (meth)acryloyl polymer, thereby forming a hard coat film having higher scratch resistance.

Inorganic Oxide Nanoparticles

The inorganic oxide nanoparticles contained in the hard coat composition may be silica particles, alumina particles or the like. Among these particles, the inorganic oxide nanoparticles preferably contain silica particles, where the silica particles preferably contain at least colloidal silica.

The inorganic oxide nanoparticles contained in the hard coat is preferably treated with a surface treatment agent. This surface treatment allows the inorganic oxide nanoparticles to be dispersed in a stable state in the hard coat composition, in particular, in the (meth)acryloyl polymer composition.

As the surface treatment agent used for the inorganic oxide nanoparticles, a compound having a substituent that can bind to the surface of the inorganic oxide nanoparticles and a substituent highly compatible with the component of the hard coat composition in which the inorganic oxide nanoparticles are dispersed, in particular, the (meth)acryloyl polymer can be used favorably. For example, a silane compound, an alcohol, an amine, a carboxylic acid, a sulfonic acid, a phosphonic acid or the like may be used as the surface treatment agent.

The inorganic oxide nanoparticles preferably have a copolymerizable group on their surface. The copolymerizable group can be introduced by a surface treatment of the inorganic oxide nanoparticles, where examples of such a copolymerizable group specifically include a vinyl group, a (meth)acrylic group, a free-radically polymerizable group and the like.

The average particle size of the inorganic oxide nanoparticles is 6 or larger but smaller than 95 nm. The average particle size of the inorganic oxide nanoparticles is more preferably 7-50 nm, and still more preferably 8-20 nm.

In order to improve the surface appearance by preventing unevenness of the surface obtained after curing the hard coat composition, inorganic oxide nanoparticles that are used preferably aggregate as little as possible.

Other Components in Tack-Free Hard Coat Composition

In addition to the (meth)acryloyl polymer and the inorganic oxide nanoparticles described above, the tack-free hard coat composition preferably further comprises a leveling agent. As the leveling agent, for example, a silicon-based surfactant, an acrylic surfactant, a fluorine-based surfactant or the like can be used favorably.

The hard coat composition preferably contains the leveling agent in an amount of 0.1% or more by weight but less than or equal to 10% by weight relative to the total weight of the hard coat composition, where the content of the leveling agent in the hard coat composition is more preferably 0.5% or more by weight but less than or equal to 7% by weight, and still more preferably 1% or more by weight but less than or equal to 5% by weight.

Other than an organic solvent, the hard coat composition may be added with various stabilizers such as a UV absorber, a light stabilizer and an antioxidant, a surfactant such as a leveling agent, a defoaming agent, a thickening agent, an antistatic agent and an antifog agent, and the like as necessary.

Preferably, the refractive index of the uncured hard coat layer is substantially equal to the refractive index of the substrate layer. Specifically, the uncured hard coat layer preferably has a refractive index in a range of 1.49-1.65. The refractive index of the uncured hard coat layer is more preferably 1.49-1.60, still more preferably 1.51-1.60, and particularly preferably about 1.53-1.59.

Furthermore, the difference in refractive index between the substrate layer and the uncured hard coat layer is preferably 0.04 or smaller, more preferably 0.03 or smaller and still more preferably 0.02 or smaller.

While the thickness of the uncured hard coat layer is not particularly limited, it is preferably 1-10 µm, more preferably 2-8 µm, and still more preferably about 3-7 µm.

<Substrate Layer>

The substrate layer included in the anti-reflection film laminate is provided on the uncured hard coat layer on the other side from the optical interference layer, and is preferably laminated to make contact with the uncured hard coat layer. Furthermore, the substrate layer is preferably arranged on the outermost side of the anti-reflection film laminate.

The substrate layer contains a thermoplastic resin. The thermoplastic resin is, for example, a transparent resin.

While the kind of the thermoplastic resin is not particularly limited, examples thereof include a polycarbonate (PC) resin, an acrylic resin such as polymethyl methacrylate (PMMA), and various resins such as polyethylene terephthalate (PET), triacetylcellulose (TAC), polyethylene naphthalate (PEN), polyimide (PI), a cycloolefin copolymer (COC), a norbornene-based resin, polyethersulfone, cellophane and an aromatic polyamide. The thermoplastic resin of the substrate layer preferably contains at least a polycarbonate resin among these options.

While the kind of the polycarbonate resin contained in the substrate layer is not particularly limited as long as it contains a —[O—R—OCO]— unit which has a carbonate bond in the main chain of the molecule (where R comprises an aliphatic group, an aromatic group, or both of an aliphatic group and an aromatic group, and further has a linear structure or a branched structure), it is preferably a polycarbonate having a bisphenol skeleton or the like, and particularly preferably a polycarbonate having a bisphenol A skeleton or a bisphenol C skeleton. The polycarbonate resin may be a mixture or a copolymer of bisphenol A and bisphenol C. A bisphenol C-based polycarbonate resin, for example, a polycarbonate resin composed solely of bisphenol C, or a polycarbonate resin composed of a mixture or a copolymer of bisphenol C and bisphenol A can be used to enhance hardness of the substrate layer.

Furthermore, the viscosity-average molecular weight of the polycarbonate resin is preferably 15,000-40,000, more preferably 20,000-35,000, and still more preferably 22,500-25,000.

Furthermore, while the acrylic resin contained in the substrate layer is not particularly limited, examples thereof include homopolymers of various (meth)acrylic acid esters as typified by polymethyl methacrylate (PMMA) and methyl methacrylate (MMA), copolymers of PMMA or MMA and at least one other monomer, and mixtures of a plurality of kinds of these resins. Among them, a (meth)acrylate having a cyclic alkyl structure which has low birefringence, low moisture absorption and excellent heat resistance is favorable. Examples of such a (meth)acrylic resin include, but not limited to, ACRYPET (manufactured by Mitsubishi Rayon Co., Ltd.), DELPET (manufactured by Asahi Kasei Corporation) and PARAPET (manufactured by Kuraray Co., Ltd.).

Moreover, a mixture of the polycarbonate resin and the above-described acrylic resin is preferably used since it can improve hardness of the substrate layer, particularly the outer layer of the substrate layer, and more particularly the outermost layer of the anti-reflection film laminate.

In addition, the substrate layer may contain an additive as a component other than the thermoplastic resin, where examples thereof include at least one kind of additive selected from the group consisting of a thermal stabilizer, an antioxidant, a flame retardant, a flame retardant auxiliary agent, a UV absorber, a release agent and a colorant. Furthermore, an antistatic agent, a fluorescent brightener, an antifog agent, a fluidity improving agent, a plasticizer, a dispersant, an antibacterial agent or the like may also be added to the substrate layer.

The thermoplastic resin is contained in the substrate layer in an amount of preferably 80% or more by mass, more preferably 90% or more by mass, and particularly preferably 95% or more by mass. Furthermore, the polycarbonate resin is contained in the thermoplastic resin of the substrate layer in an amount of preferably 80% or more by mass, more preferably 90% or more by mass, and particularly preferably 95% or more by mass.

The substrate layer preferably has a refractive index in a range of 1.49-1.65. The refractive index of the substrate layer is more preferably 1.49-1.60, still more preferably 1.51-1.60, and particularly preferably about 1.53-1.59.

While the thickness of the substrate layer is not particularly limited, it is preferably 50-500 µm, more preferably 70-400 µm, and particularly preferably 100-300 µm. Moreover, the anti-reflection film laminate may be provided with two or more substrate layers. In a case where a plurality of substrate layers are provided, the total thickness of the substrate layer is, for example, 100-1000 µm, and preferably about 200-500 µm.

Examples of a substrate layer including the plurality of layers described above, i.e., a substrate layer in a form of a multi-layer laminate, include: a substrate layer obtained by laminating, as an outer layer (layer on the low-refractive-index layer side), an acrylic resin layer composed of the above-described acrylic resin such as a polymethyl (meth) acrylate resin (PMMA: polymethyl acrylate and/or polymethyl methacrylate) on a layer composed of the above-described polycarbonate resin (PC) such as bisphenol A; and a substrate layer obtained by laminating a polycarbonate resin (PC) such as bisphenol C on a layer of a polycarbonate resin (PC) such as bisphenol A. In a laminate obtained by laminating a polycarbonate resin (PC) layer containing bisphenol A and a polycarbonate resin (PC) containing bisphenol C, for example, a polycarbonate resin containing bisphenol C is used as the outer layer.

Furthermore, a substrate layer having high hardness, in particular, a substrate layer having higher hardness than hardness of other substrate layers is preferably used as the outer layer.

Any of those exemplified above for the polycarbonate resin forming a single-layer substrate layer can be used as the polycarbonate resin, i.e., the thermoplastic resin, used in the laminate. For example, a mixture or a copolymer of bisphenol A and bisphenol C may be used. Use of a bisphenol C-based polycarbonate resin, for example, a polycarbonate resin composed solely of bisphenol C or a polycarbonate resin composed of a mixture or a copolymer of bisphenol C and bisphenol A, is found to be particularly effective in enhancing hardness of the outer layer (layer on the low-refractive-index layer side) of a substrate layer in a form of a laminate. Moreover, in order to further enhance the hardness, a mixture obtained by adding an acrylic resin described above to a polycarbonate resin such as a bisphenol C-based polycarbonate resin may be used.

<Adhesive Agent Layer>

The anti-reflection film laminate preferably has an adhesive agent layer. In the anti-reflection film laminate, the adhesive agent layer is preferably interposed between the optical interference layer and the uncured hard coat layer. An adhesive agent layer is provided so as to ensure that a first laminate having the adhesive agent layer and a second laminate having the uncured hard coat layer are laminated, preferably bonded under pressure, in a step of manufacturing an anti-reflection film laminate described in detail below.

Moreover, in an anti-reflection film laminate provided with the adhesive agent layer, the uncured hard coat layer preferably has a tack-free hard coat composition.

The adhesive agent layer preferably contains an oligomer and/or a polymer having a urethane bond, which is a reaction product of an acrylate compound and an isocyanate compound. More specifically, the adhesive agent layer preferably contains an oligomer and/or a polymer having a urethane bond, which is a reaction product of an oligomer and/or a polymer of an acrylate compound having at least one hydroxy group, and an isocyanate compound having at least one isocyanate group that binds to the hydroxy group to form a urethane bond.

The weight-average molecular weight of the oligomer and/or the polymer having a urethane bond is preferably 1,000-100,000, more preferably 1,200-50,000, and still more preferably 1,400-30,000.

The above-described acrylate compound forming the adhesive agent layer is preferably an alkyl acrylate compound with 30 or less carbon atoms, more preferably an alkyl acrylate compound with 20 or less carbon atoms, and still more preferably an alkyl acrylate compound with 15 or less carbon atoms.

Furthermore, the above-described isocyanate compound forming the adhesive agent layer is preferably an isocyanate compound having a methacryl group with 20 or less carbon atoms, more preferably an isocyanate with 15 or less carbon atoms, and still more preferably an isocyanate compound with 10 or less carbon atoms.

The adhesive agent layer preferably contains an oligomer and/or a polymer having a urethane bond represented by Formula (1) below.

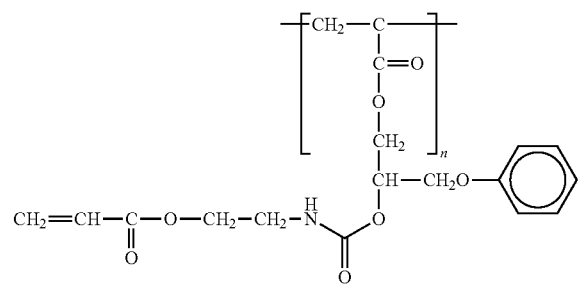

In Formula (1) above, n is an integer of 1-20, preferably an integer of 1-12, and still more preferably an integer of 1-8.

In addition, the adhesive agent layer may contain a component other than the above-described oligomer and/or polymer having a urethane bond, where examples thereof include at least one kind of additive selected from the group consisting of a thermal stabilizer, an antioxidant, a flame retardant, a flame retardant auxiliary agent, a UV absorber, a release agent and a colorant. Furthermore, an antistatic agent, a fluorescent brightener, an antifog agent, a fluidity improving agent, a plasticizer, a dispersant, an antibacterial agent or the like may be added to the adhesive agent layer.

The adhesive agent layer preferably has a refractive index in a range of 1.49-1.65. The refractive index of the adhesive agent layer is more preferably 1.49-1.60, still more preferably 1.51-1.60, and particularly preferably about 1.53-1.59.

While the thickness of the adhesive agent layer is not particularly limited, it is preferably 1-10 µm, more preferably 2-8 µm, and still more preferably about 3-7 µm.

<Additional Layer>

The anti-reflection film laminate may further be provided with a layer (additional layer) other than the above-described layers.

While the thickness of the additional layer is not particularly limited, it is preferably 0.1-10 µm and more preferably 0.5-5 µm.

[2. Method of Manufacturing Laminated Film Used as Anti-Reflection Film]

A method for manufacturing a laminated film used as an anti-reflection film of the present invention is as follows.

A method for manufacturing a laminated film used as an anti-reflection film according to a first embodiment, comprises:

a first laminating step in which an optical interference layer is laminated on a release surface of a base film to obtain a first laminate; and a second laminating step in which an uncured hard coat layer having a curable hard coat composition is laminated on one side of a substrate layer containing a thermoplastic resin to obtain a second laminate.

In the second laminating step, for example, as shown in FIG. 1, the substrate layer is a laminate of a methacrylic resin layer as a first substrate layer 12 and a polycarbonate resin layer as a second substrate layer 14, and the hard coat composition is, for example, applied on the surface of the substrate layer on the first substrate layer 12 side to form an uncured hard coat layer 20. Thus, a second laminate 10 is obtained.

The substrate layer is produced, for example, by processing a resin composition material such as a methacrylic resin or a polycarbonate resin into a layer (sheet) by a conventional technique such as extrusion or casting. Examples of extrusion include a method in which pellets, flakes or powder of the resin composition of the present invention is melted and kneaded in an extruder and then extruded from a T-die or the like, and the resulting semi-molten sheet is cooled to solidify by being pressed with rolls, thereby forming a sheet.

Meanwhile, in the first laminating step, for example, as shown in FIG. 2, a material of an optical interference layer 30 is, for example, applied to a release surface 16A of a base film 16 to form an optical interference layer 30, thereby obtaining a first laminate 40. The material used for forming the optical interference layer 30 is, for example, a curable low-refractive-index coating material, a curable high-refractive-index coating material or the like.

Alternatively, as illustrated in FIG. 3, a first laminate 40 may be obtained by laminating a release layer 18 on a base film 16 and then forming an optical interference layer 30 on the surface of the release layer 18 on the other side from the base film 16.

The base film is produced, for example, by processing a resin composition such as PET into a layer (sheet) by a conventional technique, and then applying a release agent to the surface thereof to form a release surface or a release layer.

The manufacturing method of the first embodiment further comprises a third laminating step in which the first and second laminates are laminated, preferably bonded under pressure, such that the optical interference layer of the first laminate and the uncured hard coat layer of the second laminate are in contact with each other.

For example, in the third laminating step, as shown in FIG. 4, the first laminate 40 and the second laminate 10 are laminated such that the optical interference layer 30 and the uncured hard coat layer 20 are in contact with each other.

Moreover, a method for manufacturing a laminated film used as an anti-reflection film according to a second embodiment differs from the first embodiment in that it further comprises a step of laminating an adhesive agent layer.

Specifically, the manufacturing method according to the second embodiment comprises:

a first laminating step in which an optical interference layer is laminated on a release surface of a base film and an adhesive agent layer is laminated on a surface of the optical interference layer on the other side from the release surface; and a second laminating step in which an uncured hard coat layer comprising a curable tack-free hard coat composition is laminated on a surface on one side of a substrate layer containing a transparent resin to obtain a second laminate.

The manufacturing method of the second embodiment further comprises a third laminating step in which the first and second laminates are laminated, preferably bonded under pressure, such that the adhesive agent layer of the first laminate and the uncured hard coat layer of the second laminate are in contact with each other.

In both of the first and second embodiments, the curable optical interference layer is laminated in the first laminating step and the first and second embodiments preferably further comprise a first curing step in which the optical interference layer is cured between the first laminating step and the second laminating step.

In addition, both of the first and second embodiments preferably further comprise a second curing step in which the uncured hard coat layer is cured after the third laminating step.

Accordingly, the hard coat layer in an uncured state is laminated in the second laminating step so that favorable formability can be imparted to the laminated film used as an anti-reflection film prior to the second curing step in which the uncured hard coat layer is cured. Moreover, the second curing step can take place after forming, e.g., thermoforming, the laminated film used as an anti-reflection film so that the desired shape of the anti-reflection film can be achieved easily.

The temperature upon laminating the first and second laminates, preferably upon bonding the first and second laminates under pressure, in the third laminating step is preferably 20-100° C. in both of the first and second embodiments. The temperature upon bonding under pressure is more preferably 40-80° C., and still more preferably 50-70° C.

Furthermore, in the third laminating step, the first and second laminates are preferably bonded under a pressure of 4 MPa or lower, for example, 0.5 MPa or higher but lower than or equal to 4 MPa. More preferably, the first and second laminates are bonded under a pressure of 1.0 MPa or higher but lower than or equal to 3.0 MPa.

If the first and second laminates are to be bonded under pressure, the first and second laminates are preferably passed between upper and lower rolls while being pressed by these rolls.

[3. Anti-Reflection Film]

An anti-reflection film of the present invention comprises the above-described anti-reflection film laminate. The anti-reflection film is fabricated, for example, by performing the steps of subjecting the above-described anti-reflection film laminate to thermoforming and UV curing. The base film preferably forming the outermost layer of the anti-reflection film laminate may be peeled off and removed from the release surface to give an anti-reflection film.

The anti-reflection film preferably has a cured hard coat layer which is obtained by curing the uncured hard coat layer included in the above-described anti-reflection film laminate.

Furthermore, in the anti-reflection film, the refractive index of the substrate layer is preferably 1.49-1.65, and the difference in refractive index between the substrate layer and the cured hard coat layer is preferably 0.04 or smaller. Note that the cured hard coat layer has a higher refractive index than the refractive index of the uncured hard coat layer by about 0.02.

Moreover, in the anti-reflection film, the optical interference layer comprises a low-refractive-index layer having a refractive index lower than that of the substrate layer, where the refractive index of the substrate layer is preferably 1.49-1.65 and the refractive index of the low-refractive-index layer is preferably 1.31-1.41.

[4. Properties of Laminated Film Used as Anti-Reflection Film and Anti-Reflection Film]

<Reflectance (Luminous Reflectance)>

Luminous reflectance of the surface of the anti-reflection film on the optical interference layer side is preferably 3.0% or lower, more preferably 2.5% or lower and still more preferably 1.6% or lower as measured under the conditions specified in JIS Z 8722 2009.

<Pencil Hardness>

Hardness of the surface on the optical interference layer side of the anti-reflection film is preferably high. Specifically, pencil hardness of the surface on the optical interference layer side is preferably 3B or harder, more preferably 2B or harder, still more preferably F or harder, and particularly preferably 2H or harder based on JIS K-5400.

<Scratch Resistance>

The surface on the optical interference layer side of the anti-reflection film preferably has good scratch resistance. Specifically, absolute value of the change in haze (ΔH), i.e., the difference between the haze value measured prior to the scratch test based on JIS K 7136:2000 and the haze value measured after the scratch test based on JIS K 7136:2000, is preferably lower than 2.0%.

<Thermoformability (Formability Including Deep Drawability and Right Angle-Shape Formability)>

As will be described in detail below, if an anti-reflection film laminate can be used to obtain a pressure-formed body having a sufficiently small radius R at the corner, it means that the anti-reflection film laminate can be shaped easily along a right angle-shaped area of a mold, and has excellent deep drawability and right angle-shape formability.

<Conditions of Film Surface>

The surface of the anti-reflection film laminate, particularly the surface on the optical interference layer side, preferably has good conditions. Specifically, the surface of the anti-reflection film laminate preferably has no crack, whitening, foaming or unevenness (mainly unevenness in color) observed and the resulting surface has favorable appearance after the steps of applying, drying and curing the resin material for forming the optical interference layer.

<Elongation Rate>

The anti-reflection film laminate is also excellent in elongation rate upon forming. Specifically, similar to the evaluation of thermoformability, provided that: a sample cut into a size of 210 mm×297 mm×0.3 mm (thickness) is preheated at 190° C. for 40 seconds on the polycarbonate resin (substrate layer) side; the test piece is placed in a mold having a right angle-shaped projection with a deep drawing height of 13 mm and a length and a width of 30 mm each such that the substrate layer makes contact with the mold; and the test piece is subjected to pressure forming using compressed air of 1.5 MPa, radius R of an area where the pressure-formed body makes contact with the right angle-shaped projection of the mold is 3.0 mm or smaller.

Moreover, when the above-described pressure forming is performed, the elongation rate measured as follows is preferably sufficiently large. Specifically, an evenly spaced (e.g., 1 mm) grid pattern is printed on the surface of the sample of the anti-reflection film laminate to calculate the elongation rate by Formula (III) below based on how much the space between the given grid lines increased after the pressure forming compared to that before the pressure forming.

(Space between grid lines after pressure forming (mm)−Space between grid lines before pressure forming (mm))/Space between grid lines before pressure forming (mm)×100(%)      Formula (III)

Formula (III) above is also equivalent to the following formula: (Length between given two points after pressure forming (mm)−Length between said two points before pressure forming (mm))/Length between said two points before pressure forming (mm)×100(%)

Formula (III) above can be used to calculate the elongation rate (%) after the anti-reflection film not yet subjected to pressure forming is placed to cover the right angle-shaped portion having a deep drawing height of 13 mm and pressure forming is performed. As exemplified in FIG. 5, if a grid pattern having lines evenly spaced at intervals of 1 mm is printed on the surface of the anti-reflection film laminate prior to pressure forming, and the interval between the lines of the grid pattern in a given area, for example, an area surrounded by a rhombus in FIG. 6, is 2 mm after the pressure forming, the elongation rate can be calculated by Formula (III) above as: (2 (mm)−1 (mm))/1 (mm)×100=100 (%).

Preferably, the elongation rate calculated based on Formula (III) above is sufficiently high so as to allow molding of the anti-reflection film laminate.

For example, the aforementioned elongation rate (%) is preferably equal to or higher than a value (%) obtained by increasing the deep drawing height (mm) of the mold by 10 times, more preferably by 14 times (%).

[Laminated Film]

The anti-reflection film of the present invention can also be used to manufacture a laminated film, for example, a laminated film having a transparent resin substrate and the above-described anti-reflection film. The transparent resin substrate may be, for example, one obtained by laminating a methacrylic resin layer on a bisphenol A polycarbonate layer, one obtained by laminating a bisphenol C polycarbonate layer on a bisphenol A polycarbonate layer, or the like. While the thickness of the transparent resin substrate is not particularly limited, it is preferably 30-1000 μm (1 mm), more preferably 50-700 μm, and still more preferably 100-500 μm.

Examples of the laminated film include a film attached to a surface of a computer screen, a television screen or a panel such as a plasma display panel, and a film used as a surface of a polarizing plate used for a liquid crystal display, sunglass lenses, prescription eyeglass lenses, a viewfinder lens used in a camera, various types of meter covers, glass of automobiles, glass of trains, a display panel for a vehicle and a housing for electronic equipment.

EXAMPLES

Hereinafter, the present invention will be described more specifically by way of examples. The present invention, however, should not be limited to the following examples, and can be modified and carried out in any way without departing from the scope of the present invention.

<Substrate Layer>

As the substrate layer, a transparent substrate layer having a methacrylic resin layer laminated on a polycarbonate resin layer composed of 2,2-bis(4-hydroxyphenyl)propane (bisphenol A) (DF02 manufactured by MGC Filsheet Co., Ltd., total thickness: 300 μm) was used.

In this substrate layer, the refractive index of the polycarbonate resin layer was 1.584, and the refractive index of the methacrylic resin layer was 1.491.

<Low-Refractive-Index Coating Material>

In order to form a low-refractive-index layer, a curable low-refractive-index coating material was prepared as follows. First, a flow of dry air was introduced into a five-necked flask equipped with a stirrer, a thermometer, a cooler, a monomer dropping funnel and a dry air inlet tube in advance to dry inside the system. Then, 58.9 parts by weight of 2,2,3,3-tetrafluoro-1,4-butanediol (C4DIOL manufactured by Exfluor Research Corporation), 279.8 parts by weight of pentaerythritol triacrylate, 0.5 parts by weight of dibutyltin laurate as a polymerization catalyst and 500 parts by weight of methyl ethyl ketone as a solvent were placed into the five-necked flask, and the temperature was increased to 60° C.

Subsequently, 161.3 parts by weight of isophorone diisocyanate was further placed into the reaction system, followed by reaction at 60-70° C. After confirming consumption of the isocyanate residue in the reaction product by infrared absorption spectrum, the reaction was terminated, thereby obtaining a hexafunctional urethane acrylate oligomer. Furthermore, 2-(2-vinyloxyethoxy)ethyl acrylate (VEEA) was mixed with the reaction system such that the ratio to the urethane acrylate oligomer (urethane acrylate solution) was urethane acrylate solution/VEEA=90/10 (wt %).

A hollow silica (Thrulya 4320, JGC Catalysts and Chemicals Ltd.) was added to and mixed with the liquid component of the resulting resin material at a ratio of resin material/hollow silica=35/65 (wt %). Furthermore, 5% by weight of 1-hydroxy-cyclohexyl-phenyl-ketone (I-184 manufactured by BASF) as a photoinitiator and 1% by weight of a leveling agent RS-78 (manufactured by DIC: solid content as the leveling agent was 40% by weight, which was diluted with solvent MEK) were added to and dissolved in the reaction system, to which a solvent (propylene glycol monomethyl ether) was added to adjust the concentration such that the solid content was 1.5% by weight. The resultant was used as a low-refractive-index coating material for a low-refractive-index layer (hereinafter, also referred to as low-refractive-index coating material B).

The refractive index of the resin material of the low-refractive-index coating material, that is, the refractive index of the resin material before addition of the hollow silica, was 1.486 and the refractive index of the low-refractive-index coating material B after addition of the hollow silica was 1.3651.

<High-Refractive-Index Coating Material>

First, a flow of dry air was introduced into a 3 L five-necked flask equipped with a stirrer, a thermometer, a cooler, a dropping funnel and a dry air inlet tube in advance to dry inside the system. Then, 553 parts by weight of 9,9-bis[4-(2-hydroxyethoxy)phenyl]fluorene (TBIS-G manufactured by Taoka Chemical Co., Ltd.), 592 parts by weight of 2-hydroxy-3-phenoxypropyl acrylate (M-600A manufactured by Kyoeisha Chemical Co., Ltd.), 1.5 parts by weight of dibutyltin laurate as a polymerization catalyst, 3 parts by weight of 2,6-tert-butyl-4-methylphenol (BHT) and 1500 parts by weight of methyl ethyl ketone as a solvent were placed into the five-necked flask, mixed homogeneously, and the temperature was increased to 60° C.

Subsequently, 448 parts by weight of xylene diisocyanate (XDI manufactured by Mitsui Chemicals, Inc.) was further placed into the reaction system, followed by reaction at 70° C. After confirming consumption of the isocyanate residue in the reaction product by infrared absorption spectrum, the reaction was terminated, thereby obtaining a difunctional urethane acrylate oligomer.

The liquid component of the thus-obtained resin material, i.e., the difunctional urethane acrylate oligomer (urethane acrylate solution), was mixed with 2-(2-vinyloxyethoxy) ethyl acrylate (VEEA) at a ratio of urethane acrylate solution/VEEA=90/10 (wt %). Zirconia (manufactured by Nippon Shokubai Co., Ltd.) was added to and mixed with this resin material at a ratio of resin material/zirconia=20/80 (wt %).

Furthermore, 5% by weight of 1-hydroxy-cyclohexyl-phenyl-ketone (1-184 manufactured by BASF) as a photoinitiator was added to and dissolved in the reaction system, to which a solvent (propylene glycol monomethyl ether) was added to adjust the concentration such that the solid content was 7% by weight. The resultant was used as a high-refractive-index coating material for a high-refractive-index layer (hereinafter, also referred to as high-refractive-index coating material A).

The refractive index of the resin material of the high-refractive-index coating material, that is, the refractive index of the resin material before addition of zirconia, was 1.5580 and the refractive index of the high-refractive-index coating material A after addition of zirconia was 1.7196.

<Hard Coat Composition>

A functional urethane acrylate oligomer (urethane acrylate solution: CN-968 manufactured by Sartomer) was mixed with 2-(2-vinyloxyethoxy)ethyl (meth)acrylate (VEEA) at a ratio of urethane acrylate solution/VEEA=50/50 (wt %).

To the liquid component of the resulting resin material, 5% by weight of 1-hydroxy-cyclohexyl-phenyl-ketone (1-184 manufactured by BASF) was added as a photoinitiator.

The refractive index of the thus-obtained hard coat composition was 1.4900.

Example 1

The above-described low-refractive-index coating material was applied to the release surface of a 50 µm-thick releasable PET film (base film: TR manufactured by Nippa Corporation) such that the coated film had a thickness of 100 nm when dried, and dried at 100° C. for 2 minutes. Then, the side of this releasable PET film having the dried coated film was exposed to ultraviolet light for an integrated irradiance of 500 mJ/cm² using an UV-curing device.

In the meantime, the above-described hard coat composition (hard coat coating material) was applied to the surface of the methacrylic resin layer of the above-described substrate layer such that the coated film had a thickness of 4 µm when dried, and dried at 100° C. for 2 minutes. At this point, the hard coat composition was not yet cured.

The two laminates were brought into contact with each other such that the coated surface of the above-described low-refractive-index coating material was in contact with the coated surface of the hard coat composition, and subsequently bonded under a pressure of 1.0 MPa at 60° C. to give an anti-reflection film laminate, which was then subjected to forming using a pressure forming machine. Thereafter, the laminate was cured using an UV-curing device for an integrated irradiance of 1000 mJ/cm², thereby obtaining an anti-reflection film.

Example 2

The above-described low-refractive-index coating material was applied to the release surface of a 50 µm-thick releasable PET film (base film: TR manufactured by Nippa Corporation) such that the coated film had a thickness of 100 nm when dried, and dried at 100° C. for 2 minutes. Then, the side of the above-described releasable PET film having the dried coated film was exposed to ultraviolet light for an integrated irradiance of 500 mJ/cm² using an UV-curing device. Furthermore, the high-refractive-index coating material was applied to the dried coated film of the low-refractive-index coating material such that the coated film had a thickness of 150 nm when dried, and dried at 100° C. for 2 minutes. Then, the side of the high-refractive-index coating material having the dried coated film was exposed to ultraviolet light for an integrated irradiance of 500 mJ/cm² using an UV-curing device.

In the meantime, the above-described hard coat composition (hard coat coating material) was applied to the surface of the methacrylic resin layer of the above-described substrate layer such that the coated film had a thickness of 4 μm when dried, and dried at 100° C. for 2 minutes. At this point, the hard coat composition was not yet cured.

The two laminates were brought into contact with each other such that the coated surface of the above-described low-refractive-index coating material was in contact with the coated surface of the hard coat composition, and subsequently bonded under a pressure of 1.0 MPa at 60° C. to give an anti-reflection film laminate, which was then subjected to forming using a pressure forming machine. Thereafter, the laminate was cured using an UV-curing device for an integrated irradiance of 1000 mJ/cm², thereby obtaining an anti-reflection film.

Next, comparative examples will be described. The following Comparative examples 1 and 2 differ from Example 1 described above in timing of curing the hard coat composition and in timing of forming the laminate.

Comparative Example 1

The above-described low-refractive-index coating material was applied to the release surface of a 50 μm-thick releasable PET film (base film: TR manufactured by Nippa Corporation) such that the coated film had a thickness of 100 nm when dried, and dried at 100° C. for 2 minutes.

Then, the side of the above-described releasable PET film having the dried coated film was exposed to ultraviolet light for an integrated irradiance of 500 mJ/cm² using an UV-curing device.

In the meantime, the above-described hard coat composition (hard coat coating material) was applied to the surface of the methacrylic resin layer of the above-described substrate layer such that the coated film had a thickness of 4 μm when dried, and dried at 100° C. for 2 minutes. At this point, the hard coat composition was not yet cured.

The two laminates were brought into contact with each other such that the coated surface of the above-described low-refractive-index coating material was in contact with the coated surface of the hard coat composition, and subsequently bonded under a pressure of 1.0 MPa at 60° C. to give an anti-reflection film laminate, which was then cured using an UV-curing device for an integrated irradiance of 1000 mJ/cm², thereby obtaining an anti-reflection film. The thus-obtained anti-reflection film was subjected to forming using a pressure forming machine.

Comparative Example 2

The above-described hard coat composition (hard coat coating material) was applied to the surface of the methacrylic resin layer of the above-described substrate layer such that the coated film had a thickness of 4 nm when dried, and dried at 100° C. for 2 minutes. Then, the side of the hard coat composition having the dried coated film was exposed to ultraviolet light for an integrated irradiance of 500 mJ/cm² using an UV-curing device. At this point, the hard coat composition was cured.

Furthermore, the above-described low-refractive-index coating material was applied to the coated film of the hard coat composition such that the coated film had a thickness of 100 nm when dried, and dried at 100° C. for 2 minutes. Then, the side of the low-refractive-index coating material having the dried coated film was exposed to ultraviolet light for an integrated irradiance of 500 mJ/cm² using an UV-curing device, thereby obtaining an anti-reflection film. At this point, the coated film of the low-refractive-index coating material was cured. The thus-obtained anti-reflection film was subjected to forming using a pressure forming machine.

The physical properties of the thus-manufactured anti-reflection film laminates and anti-reflection films of the examples and the comparative examples were measured as follows.

<Measurement of Physical Properties>

Adhesiveness:

Eleven each of vertical and horizontal cuts were made at spacings of 1 mm using a cutter to make 100 squares on the cured coated film of the anti-reflection film which had been removed of the releasable PET film. Cellotape (registered trademark) (adhesive tape manufactured by Nichiban Co., Ltd.) was applied to these squares and then peeled off at once in the direction of 90°. The number of squares that had the cured coated film remaining unpeeled thereon was counted. A condition where the coated film remained on all of the squares was evaluated as "good" whereas a condition with any peeling was evaluated as "poor".

Pencil Hardness:

Pencil hardness of the surface of the anti-reflection film which had been removed of the releasable PET film was evaluated on the low-refractive-index coating material side. The measurement was carried out under the conditions specified in JIS K-5400 and the evaluation was made based on the grade of the hardest pencil that left no scratch.

Scratch Resistance:

0000 steel wool was moved back and forth for 15 times under a load of 100 gf/cm² to make scratches on the surface on the low-refractive-index coating material side of the anti-reflection film which had been removed of the releasable PET film. Absolute value of the change in haze (ΔH), i.e., the difference between the haze value measured prior to the scratch test based on JIS K 7136:2000 and the haze value measured after the scratch test based on JIS K 7136:2000, was calculated and evaluated. Examples and comparative examples having ΔH values of less than 2.0% were evaluated to have good scratch resistance.

Refractive Index:

An Abbe refractometer manufactured by Atago Co., Ltd. (model type: NAR-1T LIQUID) was used in accordance with JIS K0062-1992 to measure the refractive index (nD) at 25° C. and a wavelength of 589 nm (D-line). For the solutions containing a solvent, the refractive index was measured with the solvent remaining in the solution, and the refractive index of the solvent-free solution was calculated from the measured value and the dilution ratio of the solvent.

Reflectance (Luminous Reflectance):

Reflectance of the surface on the low-refractive-index coating material side of the anti-reflection film which had been removed of the releasable PET film was measured in accordance with JIS Z 8722-2009 using SD6000 manufactured by Nippon Denshoku Industries Co., Ltd. In order to prevent reflection from the back surface (substrate layer side) of the film of each example, a black vinyl tape was applied to the surface on the other side from the coated surface side before the measurement.

Drug Resistance:

Neutrogena SPF100 was applied to the surface on the low-refractive-index coating material side of the anti-reflection film which had been removed of the releasable PET film and left at 80° C. for an hour before the appearance was visually observed.

Thermoformability (Formability Including Deep Drawability and Right Angle-Shape Formability):

The anti-reflection film laminate or the anti-reflection film obtained in each of the examples and comparative examples was cut into 210 mm×297 mm to obtain a sample. The polycarbonate resin side of the sample was preheated at 190° C. for about 40 seconds. Then, the test piece was placed in a mold including a right angle-shaped projection having a deep drawing height of 13 mm and a length and a width of 30 mm each such that the substrate layer made contact with the mold, and the test piece of the laminate was subjected to pressure forming using compressed air at a pressure of 1.5 MPa.

Formability was evaluated as good for the examples and the comparative examples when radius R of an area of the thus-obtained pressure-formed body where it made contact with the right angle-shaped portion of the mold was 3.0 mm or smaller, and when no crack was caused in the coating layer on said pressure-formed body.

The radius R of the right angle-shaped portion was actually measured using a contact-type contour measuring instrument CONTOURECORD 2700/503 (manufactured by Tokyo Seimitsu Co., Ltd.).

The process of the above-described pressure forming was as follows. First, the above-described sample of the anti-reflection film laminate or the anti-reflection film was secured by a holder. The sample was transferred to a heating zone together with the holder, where the sample was irradiated with infrared light from above, and softened by heating at a temperature higher than Tg of the sample sheet. Furthermore, the sample sheet was transferred to be placed on a mold together with the holder, where mold clamping was performed and pressurized air was introduced at the same time. Then, the sample sheet was rapidly elongated until it made contact with the surface of the mold, and thereafter rapidly cooled to a temperature lower than or equal to Tg of the sample sheet resin by making contact with the surface of the mold, thereby obtaining a shaped product fixed along the shape of the mold surface. After discharging the pressurized air and else, the shaped product was taken out to measure radius R of the right angle-shaped portion according to the above-described method.

The results of the measurements of the properties of the above-described examples and comparative examples are shown in Table 2. In the table, the refractive indices refer to values of the coating materials prior to polymerization, where the refractive indices after polymerization were all generally higher than those of the coating materials prior to polymerization by about 0.02.

TABLE 2

| | | Example 1 | Example 2 | Comparative example 1 | Comparative example 2 |
|---|---|---|---|---|---|
| First laminate (optical interference laminate) | Base film | PET film | PET film | PET film | — |
| | Low-refractive-index layer (refractive index (*1)) | Layer of cured urethane acrylate-based coating material B (1.3651) | Layer of cured urethane acrylate-based coating material B (1.3651) | Layer of cured urethane acrylate-based coating material B (1.3651) | Layer of cured urethane acrylate-based coating material B (1.3651) |
| | High-refractive-index layer (Refractive index (*1)) | — | Layer of cured urethane acrylate-based coating material A (1.7196) | — | — |
| Second laminate (hard coat laminate) | Hard coat layer (refractive index) | Layer of cured hard coat coating material (1.4900) | Layer of cured hard coat coating material (1.4900) | Layer of cured hard coat coating material (1.4900) | Layer of cured hard coat coating material (1.4900) |
| | Substrate layer (refractive index) | PC resin layer/methacrylic resin layer (1.584/1.491) | PC resin layer/methacrylic resin layer (1.584/1.491) | PC resin layer/methacrylic resin layer (1.584/1.491) | PC resin layer/methacrylic resin layer (1.584/1.491) |
| Manufacturing process | | Forming was performed with hard coat coating material in uncured state | Forming was performed with hard coat coating material in uncured state | Forming was performed with hard coat coating material in cured state | Hard coat coating material and low-refractive-index coating material were sequentially laminated and immediately cured prior to forming |
| Properties of cured laminate (*2) | Adhesiveness | Good | Good | Good | Good |
| | Pencil hardness | 3H | 3H | 3H | 3H |
| | Scratch resistance | No scratch | No scratch | No scratch | No scratch |
| | Drug resistance | Good | Good | Good | Good |
| | Luminous reflectance (%) | 1.6 | 1.1 | 1.6 | 1.6 |
| | Formability | Good | Good | Crack was caused | Crack was caused |

(*1) Refractive index measured with the low-refractive-index member or the high refractive index member being added
(*2) For formability of Examples 1 and 2, anti-reflection film laminates were evaluated before curing the hard coat composition Thus, the anti-reflection film laminates of the examples were confirmed to have excellent thermoformability while the anti-reflection films after curing had high adhesiveness between the layers, good scratch resistance, high surface hardness, excellent drug resistance and low surface reflectance.

DESCRIPTION OF REFERENCE NUMERALS

10 Laminate (second laminate)
12 First substrate layer (substrate layer: methacrylic resin layer)
14 Second substrate layer (substrate layer: polycarbonate resin layer)
16 Base film
16A Release surface
20 Uncured hard coat layer
40 Laminate (first laminate)

The invention claimed is:
1. An anti-reflection film laminate, comprising:
a base film having a release surface;
an optical interference layer laminated on the release surface;
an adhesive agent layer interposed between the optical interference layer and the uncured hard coat layer;
an uncured hard coat layer having a curable hard coat composition and laminated on the optical interference layer on the other side from the base film; and
a substrate layer having a thermoplastic resin and laminated on the uncured hard coat layer;
wherein the adhesive agent layer comprises an oligomer and/or a polymer having a urethane bond represented by Formula (1) below:

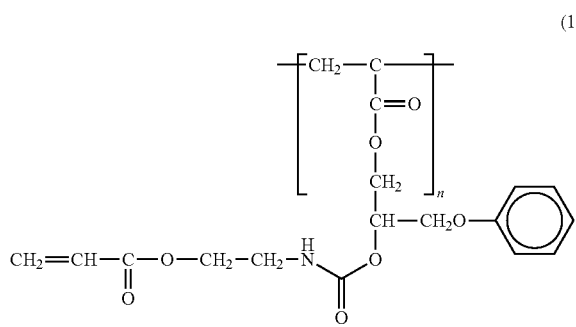

where, in Formula (1), n is an integer of 1-20.

2. The anti-reflection film laminate according to claim 1, wherein the uncured hard coat layer comprises a curable tack-free hard coat composition.

3. The anti-reflection film laminate according to claim 1, wherein the refractive index of the substrate layer is 1.49-1.65, and difference between the refractive index of the substrate layer and the refractive index of the uncured hard coat layer is 0.04 or smaller.

4. The anti-reflection film laminate according to claim 1, wherein the optical interference layer comprises a low-refractive-index layer having a refractive index lower than that of the substrate layer or a high-refractive-index layer having a refractive index higher than that of the substrate layer.

5. The anti-reflection film laminate according to claim 4, wherein the refractive index of the substrate layer is 1.49-1.65 and the refractive index of the low-refractive-index layer is 1.31-1.41.

6. The anti-reflection film laminate according to claim 4, wherein the refractive index of the substrate layer is 1.49-1.65 and the refractive index of the high-refractive-index layer is 1.68-1.75.

7. The anti-reflection film laminate according to claim 4, wherein the optical interference layer comprises the low-refractive-index layer and the high-refractive-index layer, where the high-refractive-index layer is interposed between the substrate layer and the low-refractive-index layer.

8. The anti-reflection film laminate according to claim 4, wherein the optical interference layer has only one low-refractive-index layer, or a laminate of one high-refractive-index layer and one low-refractive-index layer.

9. The anti-reflection film laminate according to claim 1, wherein the thickness of the substrate layer is 50-500 μm, and the thickness of the uncured hard coat layer is 1-10 μm.

10. The anti-reflection film laminate according to claim 1, wherein the thickness of the adhesive agent layer is 1-10 μm.

11. The anti-reflection film laminate according to claim 4, wherein the thickness of the low-refractive-index layer is 10-200 nm.

12. The anti-reflection film laminate according to claim 4, wherein the thickness of the high-refractive-index layer is 10-300 nm.

13. The anti-reflection film laminate according to claim 1, wherein the optical interference layer comprises a polymer of a resin material containing a urethane acrylate and a (meth)acrylate.

14. The anti-reflection film laminate according to claim 13, wherein the resin material contains a fluorine-containing urethane acrylate.

15. The anti-reflection film laminate according to claim 1, wherein the hard coat composition comprises at least either one of an acrylate monomer and an acrylate oligomer.

16. The anti-reflection film laminate according to claim 15, wherein the hard coat composition comprises a urethane acrylate oligomer.

17. The anti-reflection film laminate according to claim 1, wherein the optical interference layer is UV curable.

18. The anti-reflection film laminate according to claim 1, wherein provided that: the anti-reflection film laminate is cut into a test piece of 210 mm×297 mm×0.3 mm (thickness); the substrate of the test piece is preheated at 190° C. for 40 seconds; the test piece is placed in a mold including a right angle-shaped projection having a deep drawing height of 13 mm and a length and a width of 30 mm each such that the substrate layer makes contact with the mold; and the test piece of the laminate is subjected to pressure forming using compressed air at a pressure of 1.5 MPa, radius R of an area where the pressure-formed body makes contact with the right angle-shaped portion of the mold is 3.0 mm or smaller.

19. An anti-reflection film obtained by subjecting the anti-reflection film laminate according to claim 1 to thermoforming and UV curing.

20. An anti-reflection film comprising the anti-reflection film laminate according to claim 1.

21. The anti-reflection film according to claim 19, wherein the anti-reflection film comprises a cured hard coat layer obtained by curing the uncured hard coat layer, and
the refractive index of the substrate layer is 1.49-1.65, and
difference between the refractive index of the substrate layer and the refractive index of the cured hard coat layer is 0.04 or smaller.

22. The anti-reflection film according to claim 19, wherein the optical interference layer has a low-refractive-index layer having a refractive index lower than that of the substrate layer, and the refractive index of the substrate layer is 1.49-1.65, and the refractive index of the low-refractive-index layer is 1.31-1.41.

23. A method for manufacturing the anti-reflection film laminate according to claim 1, comprising:
- a first laminating step in which an optical interference layer is laminated on a release surface of a base film and an adhesive agent layer is laminated on a surface of the optical interference layer on the other side from the release surface to obtain a first laminate;
- a second laminating step in which an uncured hard coat layer comprising a curable tack-free hard coat composition is laminated on a surface on one side of a substrate layer containing a transparent resin to obtain a second laminate; and
- a third laminating step in which the first and second laminates are bonded under pressure such that the adhesive agent layer of the first laminate and the uncured hard coat layer of the second laminate are in contact with each other.

24. The method for manufacturing an anti-reflection film laminate according to claim 23, wherein the optical interference layer laminated in the first laminating step is curable, and the method further comprises, between the first laminating step and the second laminating step, a first curing step in which the optical interference layer is cured.

25. The method for manufacturing an anti-reflection film laminate according to claim 23, further comprising, following the third laminating step, a second curing step in which the uncured hard coat layer is cured.

26. The method for manufacturing an anti-reflection film laminate according to claim 23, wherein the temperature upon pressure bonding in the third laminating step is 20-100° C.

27. The method for manufacturing an anti-reflection film laminate according to claim 23, wherein, in the third laminating step, the first and second laminates are bonded under pressure by applying a pressure of 4 MPa or lower.

* * * * *